(12) United States Patent
Agiwal et al.

(10) Patent No.: US 10,454,635 B2
(45) Date of Patent: Oct. 22, 2019

(54) METHOD AND SYSTEM FOR SIGNALING AND PROCESSING CONTROL INFORMATION IN A MOBILE BROADBAND NETWORK ENVIRONMENT

(71) Applicant: Samsung Electronics Co., Ltd., Suwon-si, Gyeonggi-do (KR)

(72) Inventors: Anil Agiwal, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 15/827,801

(22) Filed: Nov. 30, 2017

(65) Prior Publication Data

US 2018/0097592 A1  Apr. 5, 2018

Related U.S. Application Data

(63) Continuation of application No. 14/349,896, filed as application No. PCT/KR2012/008056 on Oct. 4, 2012.

(30) Foreign Application Priority Data

Oct. 4, 2011 (IN) .......................... 3440/CHE/2011

(51) Int. Cl.
*H04L 5/00* (2006.01)
*H04W 24/08* (2009.01)
(Continued)

(52) U.S. Cl.
CPC .......... *H04L 5/0037* (2013.01); *H04L 5/0035* (2013.01); *H04L 5/0094* (2013.01);
(Continued)

(58) Field of Classification Search
CPC ... H04L 5/0037; H04L 5/0035; H04L 5/0094; H04W 24/08; H04W 28/16; H04W 72/042; H04W 72/0426; H04W 72/1289
See application file for complete search history.

(56) References Cited

U.S. PATENT DOCUMENTS

2003/0114196 A1* 6/2003 Chitrapu ................ H01Q 1/246
455/562.1
2008/0139236 A1   6/2008 Barrett
(Continued)

FOREIGN PATENT DOCUMENTS

CN   101242558 A   8/2008
EP   2 184 936 A1   5/2010
(Continued)

OTHER PUBLICATIONS

Samsung; On the design of CoMP CS/CB for Rel. 11; 3GPP TSG RAN WG1 Meeting #64; R1-110745; XP050490547; Feb. 21-25, 2011; Taipei, Taiwan.

*Primary Examiner* — Un C Cho
*Assistant Examiner* — Peter K Mak
(74) *Attorney, Agent, or Firm* — Jefferson IP Law, LLP

(57) ABSTRACT

A method and a system for signaling and processing control information in a cloud cell environment are provided. According to an embodiment, in a cloud cell, a master Base Station (BS) coordinates with other BSs to determine resources available for use on communication links between a mobile station in the cloud cell and one or all the BSs during a scheduling interval. Based on the resources available, the master BS allocates cumulative resources associated with the BSs to the mobile station for the scheduling interval. Then, the master BS transmits resource allocation control information indicating the allocated cumulative resources to the mobile station over a communication link between the master BS and the mobile station. Upon receiv- (Continued)

ing the resource allocation control information, the mobile station decodes the information and receives data packets from each of the BSs during the scheduling interval according to the decoded resource allocation control information.

20 Claims, 25 Drawing Sheets

(51) Int. Cl.
    *H04W 28/16*     (2009.01)
    *H04W 72/12*     (2009.01)
    *H04W 72/04*     (2009.01)

(52) U.S. Cl.
    CPC ........... *H04W 24/08* (2013.01); *H04W 28/16* (2013.01); *H04W 72/042* (2013.01); *H04W 72/0426* (2013.01); *H04W 72/1289* (2013.01)

(56) References Cited

U.S. PATENT DOCUMENTS

| | | | |
|---|---|---|---|
| 2010/0027456 A1* | 2/2010 | Onggosanusi | H04B 7/024 370/312 |
| 2010/0061298 A1* | 3/2010 | Kato | H04L 5/0016 370/328 |
| 2010/0234034 A1 | 9/2010 | Aoyama et al. | |
| 2010/0322135 A1 | 12/2010 | Van Lieshout et al. | |
| 2010/0322158 A1* | 12/2010 | Lee | H04L 5/001 370/329 |
| 2011/0044278 A1 | 2/2011 | Astely et al. | |
| 2011/0045834 A1* | 2/2011 | Kim | H04L 45/306 455/438 |
| 2011/0053598 A1 | 3/2011 | Ahluwalia | |
| 2011/0188481 A1 | 8/2011 | Damnjanovic et al. | |
| 2011/0211551 A1 | 9/2011 | Parkvall | |
| 2011/0222460 A1* | 9/2011 | Fahldieck | H04L 5/0023 370/312 |
| 2011/0268007 A1 | 11/2011 | Barany et al. | |
| 2011/0310841 A1* | 12/2011 | Jung | H04W 36/0055 370/331 |
| 2012/0046039 A1* | 2/2012 | Hagerman | H04B 7/10 455/450 |
| 2012/0069825 A1 | 3/2012 | Ode et al. | |
| 2012/0087266 A1 | 4/2012 | Vajapeyam et al. | |
| 2013/0040675 A1 | 2/2013 | Anto et al. | |

FOREIGN PATENT DOCUMENTS

| | | |
|---|---|---|
| WO | 2008/155764 A2 | 12/2008 |
| WO | 2010/052062 A1 | 5/2010 |
| WO | 2010/093644 A1 | 8/2010 |
| WO | 2010/146617 A1 | 12/2010 |

\* cited by examiner

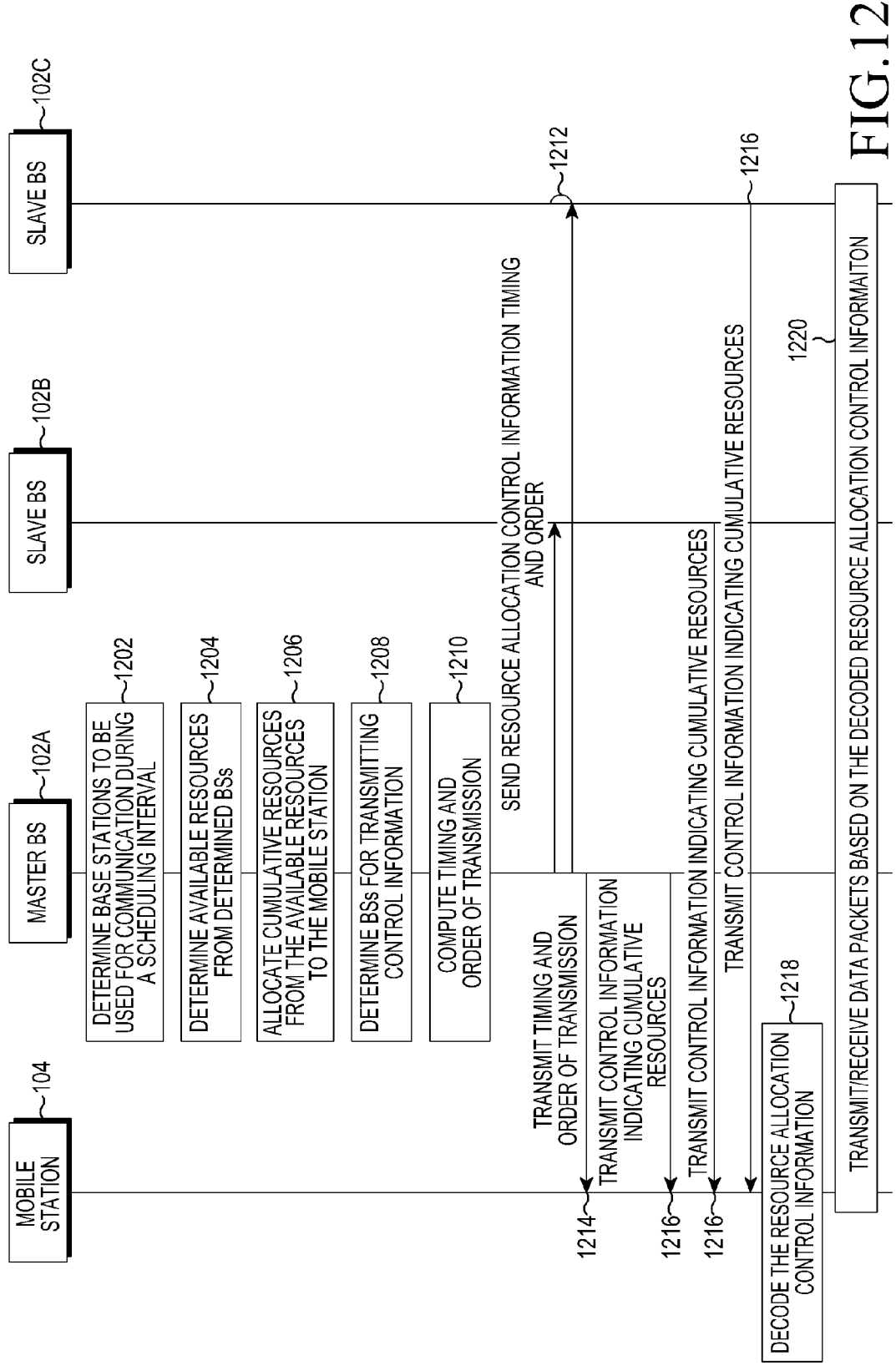

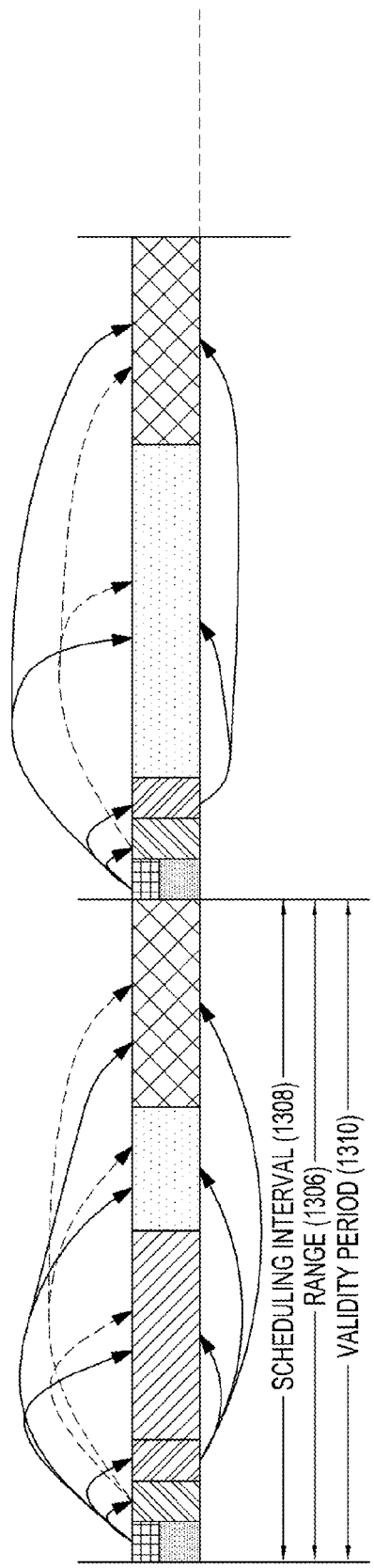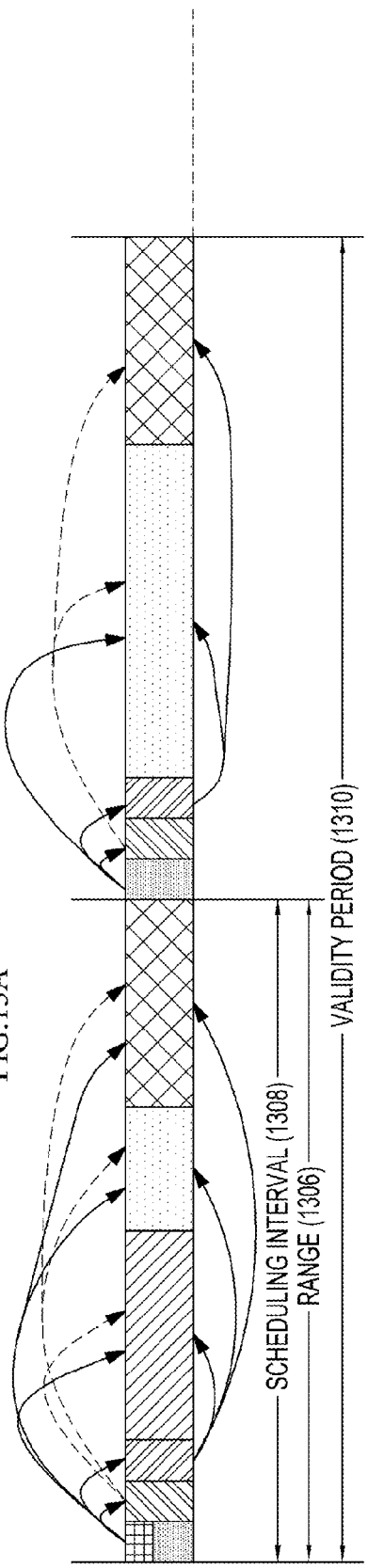
FIG. 13A
FIG. 13B

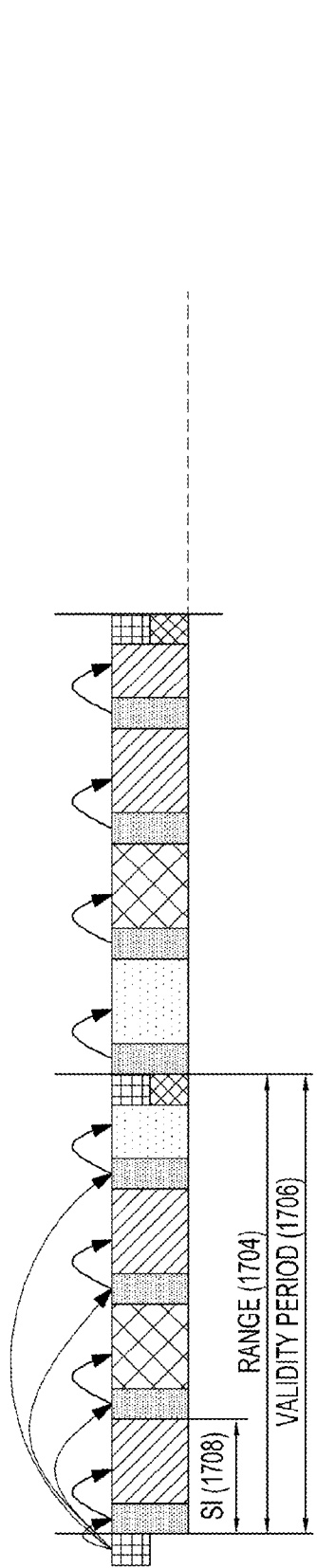
FIG. 17A
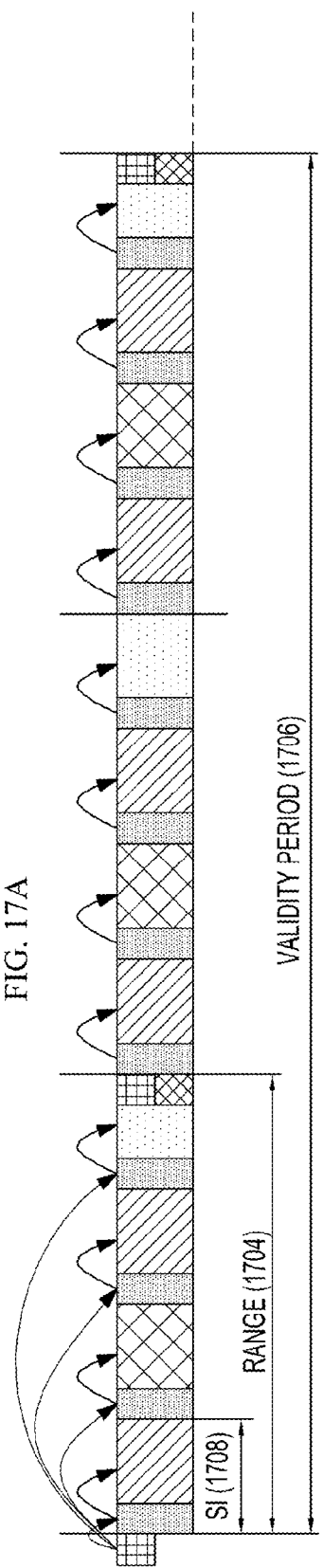
FIG. 17B
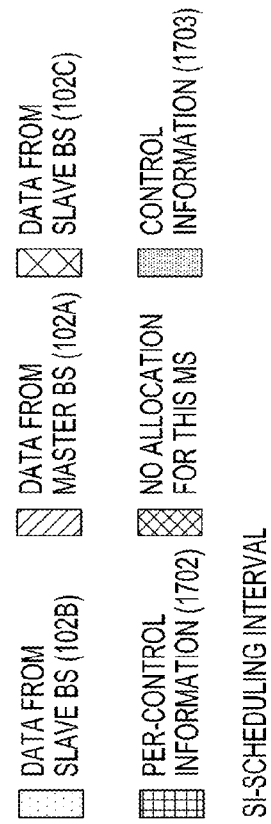

METHOD AND SYSTEM FOR SIGNALING AND PROCESSING CONTROL INFORMATION IN A MOBILE BROADBAND NETWORK ENVIRONMENT

CROSS-REFERENCE TO RELATED APPLICATION(S)

This application is a continuation application of prior application Ser. No. 14/349,896, filed Apr. 4, 2014, which is a U.S. National Stage application under 35 U.S.C. § 371 of an International application filed on Oct. 4, 2012 and assigned application number PCT/KR2012/008056, which claimed the benefit of an Indian patent application filed on Oct. 4, 2011 in the Indian Intellectual Property Office and assigned serial number 3440/CHE/2011, the entire disclosure of which is hereby incorporated by reference.

TECHNICAL FIELD

The present disclosure relates to the field of a mobile broadband system with multiple base stations serving a single mobile station. More particularly, the present disclosure relates to a method and system for signaling and processing control information in a mobile broadband network environment.

BACKGROUND

A Millimeter-Wave Mobile Broadband (MMB) system is a millimeter wave based system which operates in a radio frequency range between 30 Gigahertz (GHZ) and 300 GHz. An MMB system uses radio waves with a wavelength in the range of 1 millimeter (mm) to 10 mm and is a candidate for next generation mobile communication technology due to the considerable amount of spectrum available in mmWave band.

Generally, in an MMB system, MMB base stations are deployed with higher density than macro-cellular base stations in order to ensure good network coverage. This is possible as transmission and reception of signals is based on narrow beams which suppresses interference from neighboring MMB base stations and extends the range of an MMB link.

Typically, in a MMB network, multiple base stations form a grid with a large number of nodes with which a mobile station can communicate, thereby ensuring high quality Equal Grade Of Service (EGOS) irrespective of the location of the mobile station. The grid having a plurality of base stations serving a mobile station is commonly termed as a virtual cell or a cloud cell. In a could cell, the multiple base stations communicating with a mobile station need to perform downlink transmission beamforming while the mobile station communicating with the base stations needs to perform downlink reception beamforming for receiving downlink control information and data packets. Similarly, a mobile station communicating with a base station in a cloud cell may need to perform uplink transmission beamforming while the base station needs to perform uplink reception beamforming for transmitting uplink data.

Further, in a cloud cell, one base station acts as a master base station and the remaining base stations act as slave base stations with respect to the mobile station. The base stations in the cloud cell serving a mobile station keep changing dynamically based on movement of the mobile station. The cloud cell thus is a user centric virtual cell. In an overlapping cloud cell scenario, a base station can be a part of more than one cloud cell. In one cloud cell, the base station may act as a master base station for one mobile station and in another cloud cell, the same base station may act as a slave base station for another mobile station or the base station can act as a master base station for another mobile station.

One or multiple base stations in a cloud cell may be used to transmit data to a mobile station in a DownLink (DL) direction (i.e., from a base station to a mobile station). The multiple base stations may transmit the same or different data to the mobile station. Similarly in the UpLink (UL) direction, data from the mobile station to a wireless network may be transmitted using one or multiple base stations. In order to receive or transmit data in DL and UL respectively, the mobile station needs to decode control information carrying resource allocation information. That is, the resource allocation information precedes actual transmission of data in DL and UL. The resource allocation information provides details necessary to decode physical layer packets transmitted in the DL or to encode the physical layer packet for transmission in the UL. For example, in an Orthogonal Frequency Division Multiple Access (OFDMA) system, the resource allocation information may include subcarriers and OFDM symbols for which a physical layer packet will span, modulation and coding scheme, power level, MIMO parameters, MS address, etc.

In systems of the related art, the mobile station communicates with a single base station and receives resource allocation information from that base station. Based on the resource allocation information, the mobile station receives and/or transmits data with the base station. However, in a cloud cell, the mobile station has to receive/transmit the same or different data simultaneously from multiple base stations in the cloud cell. Thus, each of the base stations signaling resource allocation information to the mobile station and the mobile station receiving/transmitting data from/to multiple base stations may not be feasible in the cloud cell environment unlike the wireless communication systems of the related art. Accordingly, there is a need for an improved apparatus and method for signaling and processing control information in a cloud cell environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for signaling and processing control information in a cloud cell environment.

In accordance with an aspect of the present disclosure, a method for processing control information in a cloud cell comprising at least one mobile station and a plurality of base stations, the plurality of base stations comprising one or more slave base stations and a master base station, is provided. The method includes monitoring a communication link between the master base station and the mobile station for control information associated with one or more of the plurality of base stations in the cloud cell, receiving the control information from the master base station over the communication link, wherein the control information indicates cumulative resource allocation control information associated with the one or more of the plurality of base stations in the cloud cell, decoding the received cumulative resource allocation control information, and receiving and transmitting one or more data packets from/to one or more of the plurality of base stations according to the decoded resource allocation control information during a scheduling interval.

In accordance with another aspect of the present disclosure, a method for signaling control information in a cloud cell comprising at least one mobile station and a plurality of base stations, the plurality of base stations comprising one or more slave base stations and a master base station, is provided. The method includes determining one or more of the plurality of base stations to be used for communication with the mobile station during a scheduling interval, determining resources associated with each of the one or more base stations available for allocation to the mobile station for the scheduling interval, allocating resources to the mobile station for the scheduling interval from the available resources associated with each of the one or more base stations, and transmitting control information to the mobile station over a communication link between the master base station and the mobile station, wherein the control information indicates the cumulative resources associated with the one or more base stations for the scheduling interval.

In accordance with another aspect of the present disclosure, a method for processing control information in a cloud cell comprising at least one mobile station and a plurality of base stations, the plurality of base stations comprising one or more slave base stations and a master base station, is provided. The method includes monitoring a communication link between a base station and the mobile station for control information associated with one or more of the plurality of base stations in the cloud cell, receiving the control information from a base station over the communication link, wherein the control information indicates cumulative resource allocation control information associated with the one or more of the plurality of base stations in the cloud cell, decoding the received cumulative resource allocation control information, and receiving and transmitting one or more data packets from/to one or more of the plurality of base stations according to the decoded resource allocation control information during a scheduling interval.

In accordance with another aspect of the present disclosure, a method for signaling control information in a cloud cell comprising at least one mobile station and a plurality of base stations, the plurality of base stations comprising one or more slave base stations and a master base station, is provided. The method includes determining one or more of the plurality of base stations to be used for communication with the mobile station during a scheduling interval, determining resources associated with each of the one or more base stations available for allocation to the mobile station for the scheduling interval, allocating resources to the mobile station for the scheduling interval from the available resources associated with each of the one or more base stations, selecting a base station from the plurality of base stations for transmitting control information to the mobile station for the scheduling interval, wherein the control information indicates the cumulative resources associated with the one or more base stations for the scheduling interval, and transmitting control information to the selected base station if the base station other than the master base station is selected for transmitting the control information so that the selected base station transmits the control information to the mobile station over a communication link between the mobile station and the selected base station.

In accordance with another aspect of the present disclosure, a method for processing control information in a cloud cell comprising at least one mobile station and a plurality of base stations, the plurality of base stations comprising one or more slave base stations and a master base station, is provided. The method includes monitoring a respective communication link between one or more of the plurality of base stations and the mobile station for control information associated with the one or more of the plurality of base stations in the cloud cell, receiving the control information from the one or more of the plurality of base stations over the respective communication link, wherein the control information indicates cumulative resource allocation control information associated with the one or more of the plurality of base stations in the cloud cell, decoding the cumulative resource allocation control information received from at least one of the plurality of base stations, and receiving and transmitting one or more data packets from/to one or more of the plurality of base stations according to the decoded resource allocation control information during a scheduling interval.

In accordance with another aspect of the present disclosure, a method for signaling control information in a cloud cell comprising at least one mobile station and a plurality of base stations, the plurality of base stations comprising one or more slave base stations and a master base station, is provided. The method includes determining one or more of the plurality of base stations to be used for communication with the mobile station during a scheduling interval, determining resources associated with each of the one or more base stations available for allocation to the mobile station for the scheduling interval, allocating resources to the mobile station for the scheduling interval from the available resources associated with each of the one or more base stations, and transmitting control information to the one or more slave base stations so that each of the one or more base station transmits the control information to the mobile station over a respective communication link in a predefined order at a pre-defined time, wherein the control information indicates the cumulative resources associated with the one or more base stations for the scheduling interval.

In accordance with another aspect of the present disclosure, a method for processing control information in a cloud cell comprising at least one mobile station and a plurality of base stations, the plurality of base stations comprising one or more slave base stations and a master base station, is provided. The method includes monitoring a respective communication link between the master base station and the mobile station for control information associated with one or more of the plurality of base stations in the cloud cell, receiving the control information from the master base station over the respective communication link, wherein the control information indicates cumulative resource allocation control information associated with the one or more of the plurality of base stations in the cloud cell, decoding the received cumulative resource allocation control information received from the master base station, determining whether the control information received from the master base station is successfully decoded, receiving and transmitting one or more data packets from/to one or more of the plurality of base stations according to the decoded resource allocation control information during a scheduling interval if the control information is successfully decoded, sending a feedback message to one of the slave base stations if the control information cannot be successfully decoded so that said slave base station transmits the control information over the communication link between the slave base station and the mobile station, and repeating the steps of receiving, decoding, determining and sending a feedback message.

In accordance with another aspect of the present disclosure, a method for signaling control information in a cloud cell comprising at least one mobile station and a plurality of base stations, the plurality of base stations comprising one or more slave base stations and a master base station, is provided. The method includes determining one or more of the plurality of base stations to be used for communication with the mobile station during a scheduling interval, determining resources associated with each of the one or more base stations available for allocation to the mobile station for the scheduling interval, allocating cumulative resources to the mobile station for the scheduling interval from the available resources associated with each of the one or more base stations, and transmitting control information to the one or more slave base station so that each of the one or more base station transmits the control information to the mobile station over a respective communication link in a predefined order at a pre-defined time till the mobile station successfully decoded the control information received from one of the one or more base stations, wherein the control information indicates the cumulative resources associated with the one or more base stations for the scheduling interval.

In accordance with another aspect of the present disclosure, a method for signaling control information in a cloud cell comprising at least one mobile station and a plurality of base stations, the plurality of base stations comprising one or more slave base stations and a master base station, is provided. The method includes determining one or more of the plurality of base stations to be used for communication with the mobile station during a scheduling interval, transmitting pre-control information to the mobile station based on the determination, allocating resources to the mobile station for the scheduling interval from the available resources associated with the one or more base stations, and transmitting respective control information to the mobile station over a communication link by the one or more base station based on the pre-control information, wherein the control information indicates the resources associated with the respective one or more base stations for the scheduling interval.

In accordance with another aspect of the present disclosure, a method for signaling control information in a cloud cell comprising at least one mobile station and a plurality of base stations, the plurality of base stations comprising one or more slave base stations and a master base station, is provided. The method includes determining one or more of the plurality of base stations to be used for communication with the mobile station during a scheduling interval, transmitting pre-control information to the mobile station based on the determination, allocating resources to the mobile station for the scheduling interval from the available resources associated with the one or more base stations, and transmitting respective control information to the mobile station over a communication link by the one or more base station based on the pre-control information, wherein the control information indicates the resources associated with the respective one or more base stations for the scheduling interval.

In accordance with another aspect of the present disclosure, a mobile station is provided. The mobile station includes a processor, a memory coupled to the processor, and a transceiver coupled to the processor, wherein the memory includes a control information processing module configured to monitor a communication link with at least one of a plurality of base stations in a cloud cell for control information associated with one or more of the plurality of base stations, wherein the plurality of base station includes slave base stations and a master base station, to receive the control information from the at least one of the plurality of base stations over the communication link using the transceiver, wherein the control information comprises resource allocation control information associated with the one or more base stations, to decode the received resource allocation control information, and to receive and transmit one or more data packets from/to the one or more base stations during a scheduling interval according to the decoded resource allocation control information.

In accordance with another aspect of the present disclosure, a base station is provided. The base station includes a processor, a memory coupled to the processor, and a transceiver coupled to the processor, wherein the memory includes a control information module configured to determine one or more of a plurality of base stations in a cloud cell to be used for communication with a mobile station during a scheduling interval, wherein the plurality of base stations comprises one or more slave base station and a master base station, determine resources associated with each of the one or more base stations available for use on respective communication links during the scheduling interval, allocate cumulative resources to the mobile station for the scheduling interval from the available resources associated with each of the one or more base stations, and transmit resource allocation control information that indicates the cumulative resources associated with the one or more base stations using the transceiver.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 is a flow diagram illustrating a method of signaling and processing resource allocation control information to a mobile station according to an embodiment.

FIGS. 13A and 13B are schematic representations depicting transmitting of resource allocation control information to a mobile station by multiple BSs during a scheduling interval according to an embodiment of the present disclosure.

FIGS. 17A and 17B are schematic representations depicting communication of pre-control information from a master BS before the start of every validity period according to an embodiment of the present disclosure.

Figure 1:
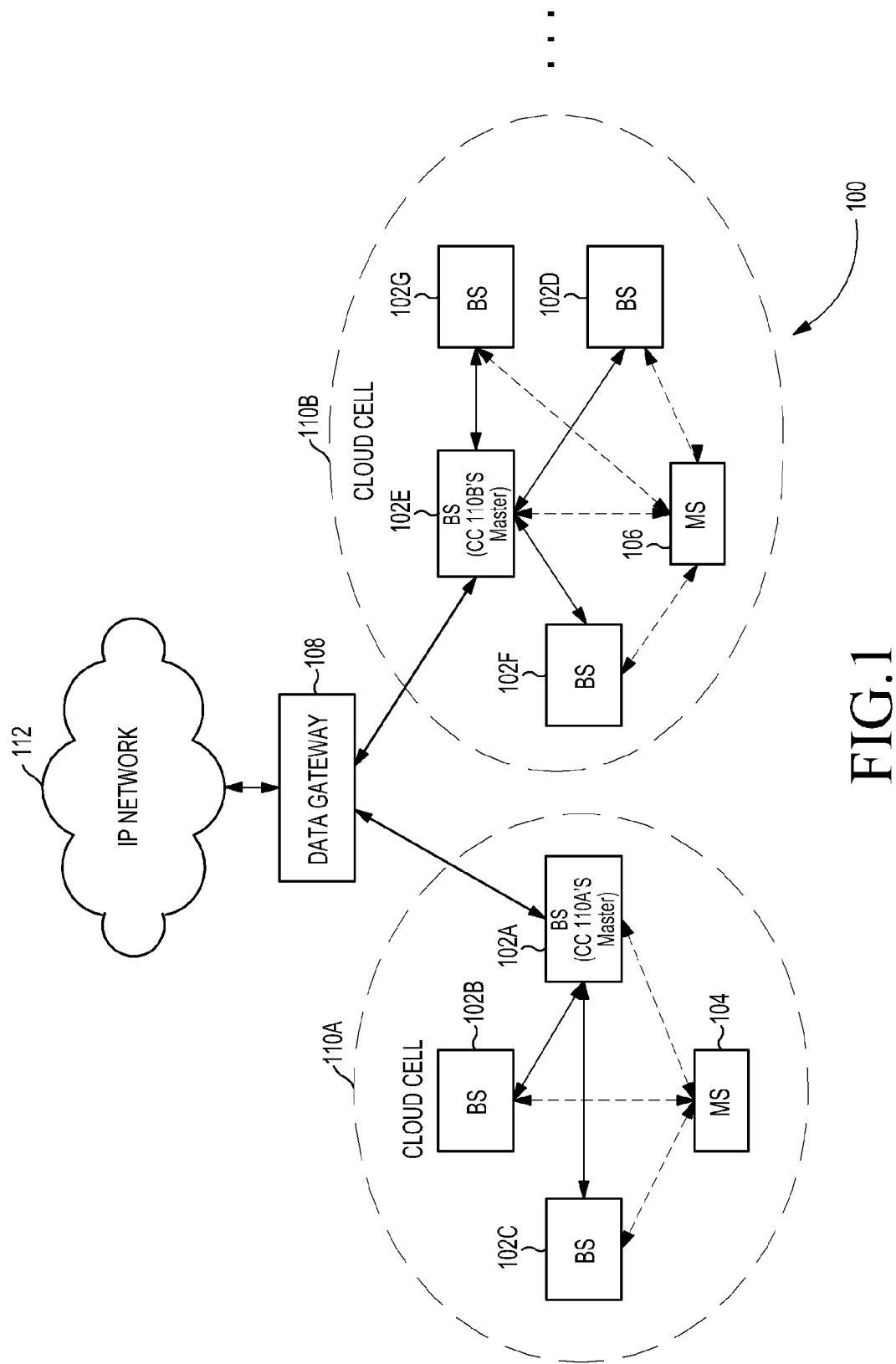
FIG. 1 is a schematic diagram illustrating a cloud cell environment according to an embodiment of the present disclosure.

The drawings described herein are for illustration purposes only and are not intended to limit the scope of the present disclosure in any way.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure provides a method and system for signaling and processing control information in a cloud cell environment. In the following detailed description of various embodiments of the present disclosure, reference is made to the accompanying drawings that form a part hereof, and in which are shown by way of illustration various embodiments in which the present disclosure may be practiced. These various embodiments are described in sufficient detail to enable those skilled in the art to practice the disclosure, and it is to be understood that other various embodiments may be utilized and that changes may be made without departing from the scope of the present disclosure. The following detailed description is, therefore, not to be taken in a limiting sense, and the scope of the present disclosure is defined only by the appended claims.

FIG. 1 is a schematic diagram illustrating a cloud cell environment according to an embodiment of the present disclosure.

Referring to FIG. 1, the cloud cell environment 100 includes a plurality of cloud cells 110A, 110B . . . 110N. A cloud cell is a user centric virtual cell consisting of a plurality of base stations serving a mobile station. A cloud cell serving a mobile station may have the same base stations as in another cloud cell serving another mobile station. Also, a cloud cell serving a mobile station may have some base stations that are the same as base stations in another cloud cell serving another mobile station. On the other hand, all base stations of a cloud cell serving a mobile station may all be distinct from base stations in another cloud cell serving another mobile station. A cloud cell consisting of two or more BSs is formed when a mobile station enters a wireless network. Base stations in a cloud cell as well as a master base station may change based on the movement of the mobile station. When a base station joins or exits the cloud cell, the cloud cell is said to be updated.

For the purpose of illustration, two cloud cells (e.g., the cloud cell 110A and the cloud cell 110B) are depicted in FIG. 1. The cloud cell 110A includes multiple Base Stations (BSs) 102A to 102C serving a Mobile Station (MS) 104. In the cloud cell 110A, the BS 102A is assigned a role of a master and each of the remaining BSs 102B and 102C acts as a slave BS Similarly, the cloud cell 110B includes multiple BSs 102D to 102G serving a mobile station 106. In the cloud cell 110B, the BS 102E is a master BS while each of the remaining BSs 102D, 102F and 102G acts as a slave BS. In each of the cloud cells 110A-N, a master BS can directly communicate data packets with a data gateway 108 while a slave BS communicates with the data gateway 108 via the master BS. The data gateway 108 may be directly connected to an Internet Protocol (IP) network 112 or connected via other network nodes.

According to an embodiment of the present disclosure, in the cloud cell 110A, the master BS 102A coordinates with other BSs 102B-C to determine resources available for use on communication links between the mobile station 104 and one or all of the BSs 102A-C during a scheduling interval. Based on the resources available, the master BS 102A allocates cumulative resources associated with each of the BSs 102A-C to the mobile station 104 for the scheduling interval. Then, the master BS 102A transmits resource allocation control information indicating the allocated cumulative resources to the mobile station 104 over a communication link between the master BS 102A and the mobile station 104. The resource allocation control information provides details necessary to decode physical layer packets transmitted in the downlink direction and/or to encode physical layer packets for transmission in the uplink direction. Upon receiving the resource allocation control information, the mobile station 104 decodes the same and receives data packets from each of the BSs 102A-C during the scheduling interval according to the decoded resource allocation control information. In this manner, control information on resources from one or more base stations is provided to a mobile station in a cloud cell during every scheduling interval. This and other various embodiments are explained in greater detail in the following description of FIGS. 2 to 22.

Figure 2:
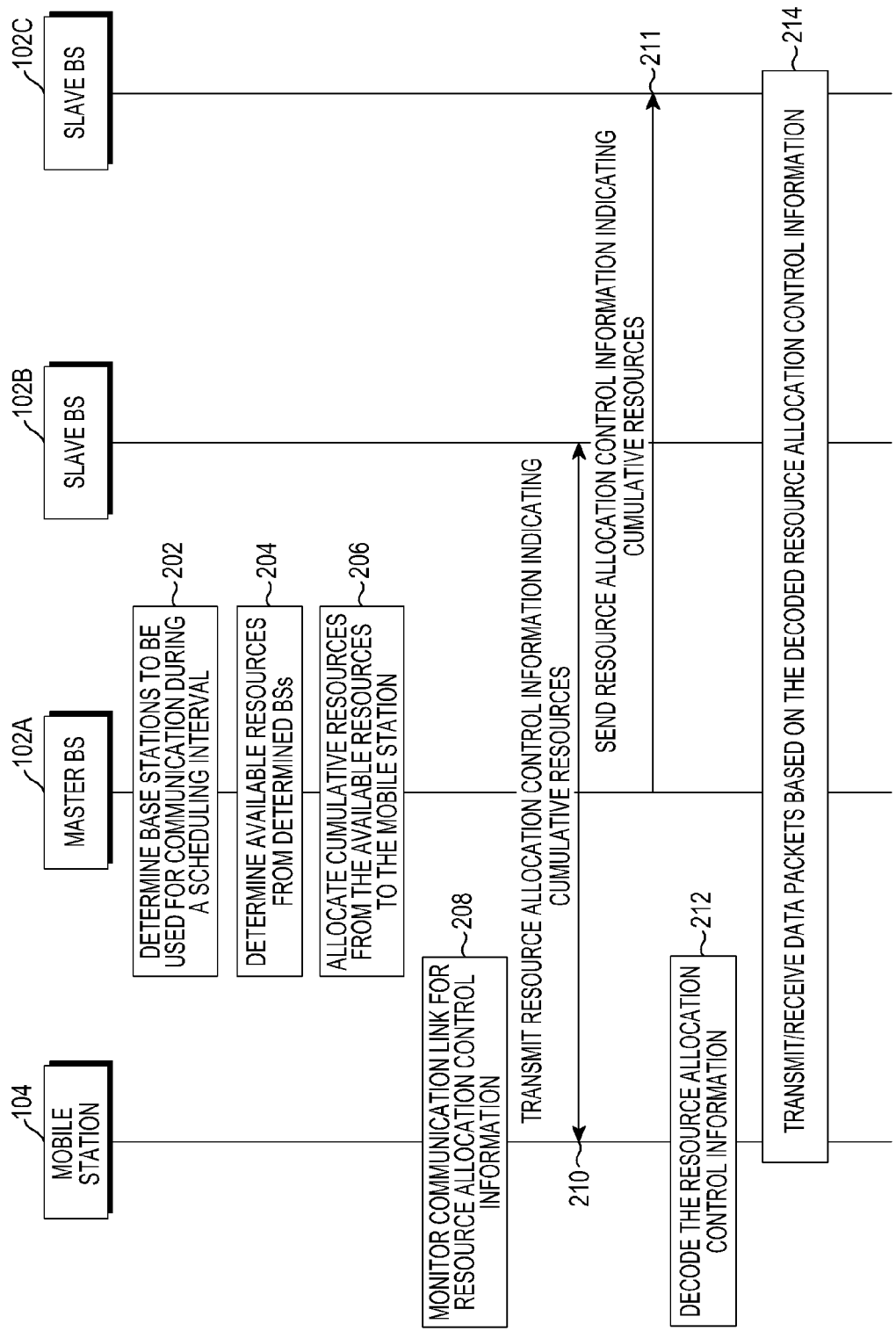
FIG. 2 is a flow diagram illustrating a method of signaling and processing resource allocation control information to a mobile station in a cloud cell according to an embodiment of the present disclosure.

FIG. 2 is a flow diagram illustrating a method of signaling and processing resource allocation control information to a mobile station according to an embodiment of the present disclosure.

Referring to FIG. 2, before every scheduling interval, a master BS 102A determines which of base stations in the cloud cell 110A are to be used for communicating with the mobile station 104 during a scheduling interval, at operation 202. It is possible that the master BS 102A may determine that none of the slave BSs 102B and 102C are to be used for communication with the mobile station 104 for a particular scheduling interval. It is also possible that the master BS 102A may determine that the slave BSs 102B and 102C may only be used for communication with the mobile station 104 for another scheduling interval. For the purpose of illustration, it is assumed that the master BS 102A, at operation 202, determines that all the BSs 102A-C in the cloud cell are to be used for communication during the scheduling interval.

Figure 4:
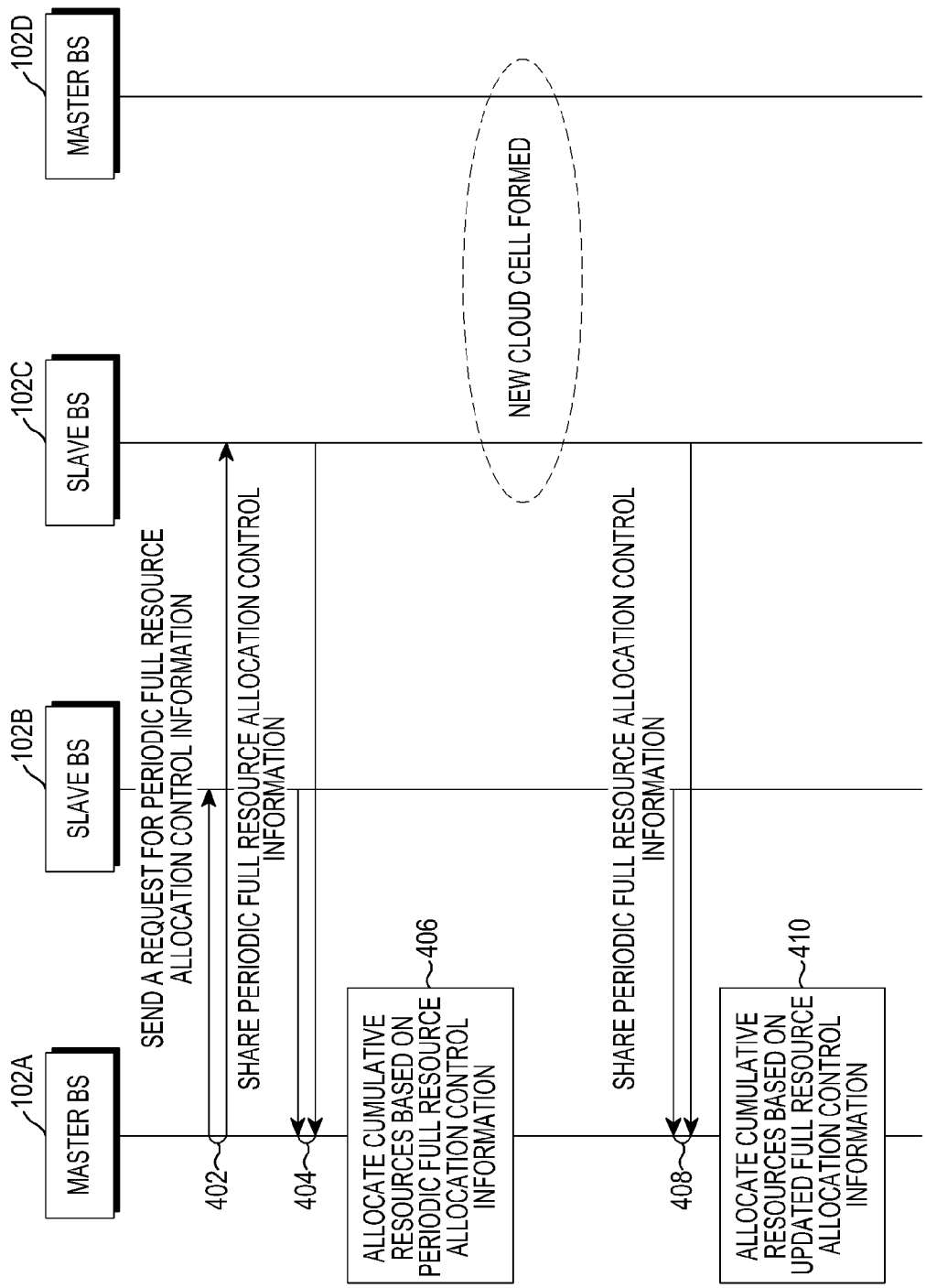
FIG. 4 is a flow diagram illustrating a method of determining resources associated with BSs available for use during every scheduling interval according to an embodiment of the present disclosure.
Figure 5:
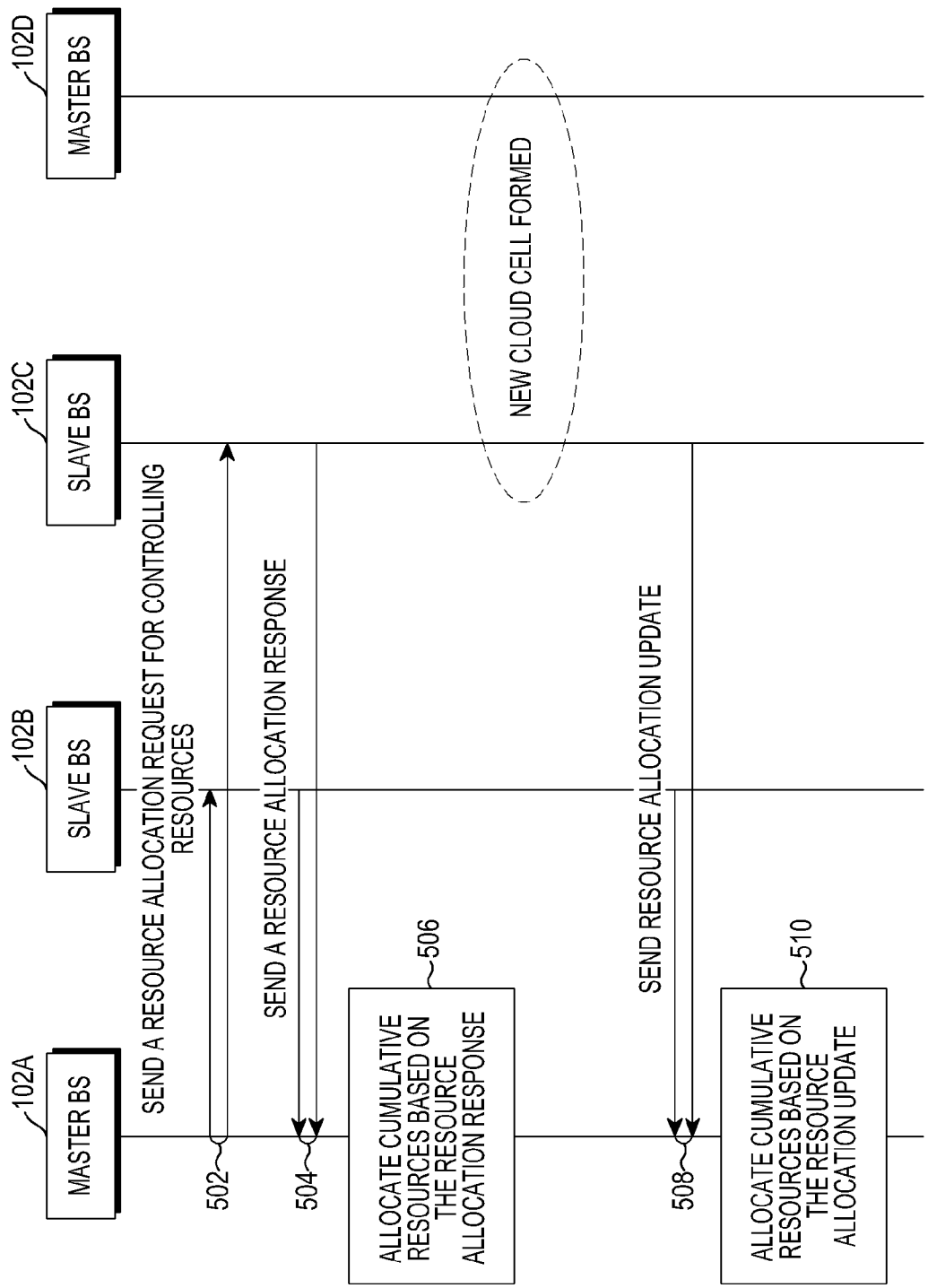
FIG. 5 is a flow diagram illustrating a method of determining resources associated with BSs available for use during every scheduling interval according to an embodiment of the present disclosure.

At operation 204, the master BS 102A determines resources associated with itself, and the slave BSs 102B and 102C available for use on a respective communication link between the mobile station 104 and the BSs 102A-C during the scheduling interval. In an embodiment of the present disclosure, the master BS 102A also coordinates with the slave BSs 102B and 102C to determine available resources across the slave BSs 102B and 102C. In an alternative embodiment of the present disclosure, the master BS 102A may receive resource allocation control information indicating respective resources to be used on respective communication links from the slave BSs 102B and 102C. The master BS 102A combines the resource allocation control information received from the slave BSs 102B and 102C and transmits the combined resource allocation control information to the mobile station 104. Methods of determining resources available for use on communication links between the mobile station 104 and the BSs 102A-C are illustrated in FIGS. 3 to 5.

At operation 206, the master BS 102A allocates cumulative resources to the mobile station 104 for the scheduling interval from the available resources associated with the master BS 102A, the slave BS 102B and the slave BS 102C. For example, the cumulative resources may include downlink resources and/or uplink resources from the BSs 102A to 102C assigned for use on respective communication links between the mobile station 104 and the BSs 102A-C. The master BS 102A may allocate uplink resources from the BSs 102A-C to the mobile station 104 based on a number of transmit chains in the mobile station 104. Similarly, the master BS 102A may allocate downlink resources from the BSs 102A-C to the mobile station 104 based on the number of receive chains in the mobile station 104. For example, if the mobile station 104 has a single receive chain, then the master BS 102A allocates the down link resources from each BS at a time or multiple BSs 102A-C in a time multiplexed manner within the scheduling interval. Alternatively, when the mobile station 104 has multiple receive chains, the master BS 102A may allocate downlink resources from multiple BSs at a time or in a time multiplexed manner, wherein the number of BSs scheduled at a time is equal to or less than the number of receive chains in the mobile station 104.

At operation 208, the mobile station 104 monitors a communication link between the master BS 102A and the mobile station 104 for resource allocation control information. In some various embodiments, the resource allocation control information includes cumulative resources from the BSs 102A to 102C allocated to the mobile station 104 for downlink and uplink transmission. It can be noted that, the mobile station 104 monitors the control information from the master BS 102A irrespective of whether the same or different data is transmitted in downlink and/or uplink between the mobile station 104 and the BSs 102A to 102C. At operation 210, the master BS 102A transmits the resource allocation control information to the mobile station 104 over the communication link. Also, the master BS 102A sends the resource allocation information to the slave BSs 102B and 102C when the master BS 102A has allocated the cumulative resources from the BSs 102A-C to the mobile station 104, at operation 211. At operation 212, the mobile station 104 decodes the received cumulative resource allocation control information. At operation 214, the mobile station 104 and the base stations 102A-C transmits/receives data packets to/from the BSs 102A-C during the scheduling interval according to the decoded resource allocation control information. If the mobile station 104 has a single receive chain, then the mobile station 104 receives data packets from each of the BSs 102A to 102C according to the decoded resource allocation control information using the single receive chain. Alternatively, if the mobile station 104 has multiple receive chains, the mobile station 104 receives data packets from the BSs 102A to 102C according to the decoded resource allocation control information using the multiple receive chains. In some embodiments, when the mobile station 104 has multiple receive chains, the mobile station 104 may use a dedicated receive chain for receiving control information and/or data packets from the master BS 102A and remaining receive chain(s) for receiving data packets from the slave BSs 102B and 102C.

Figure 3:
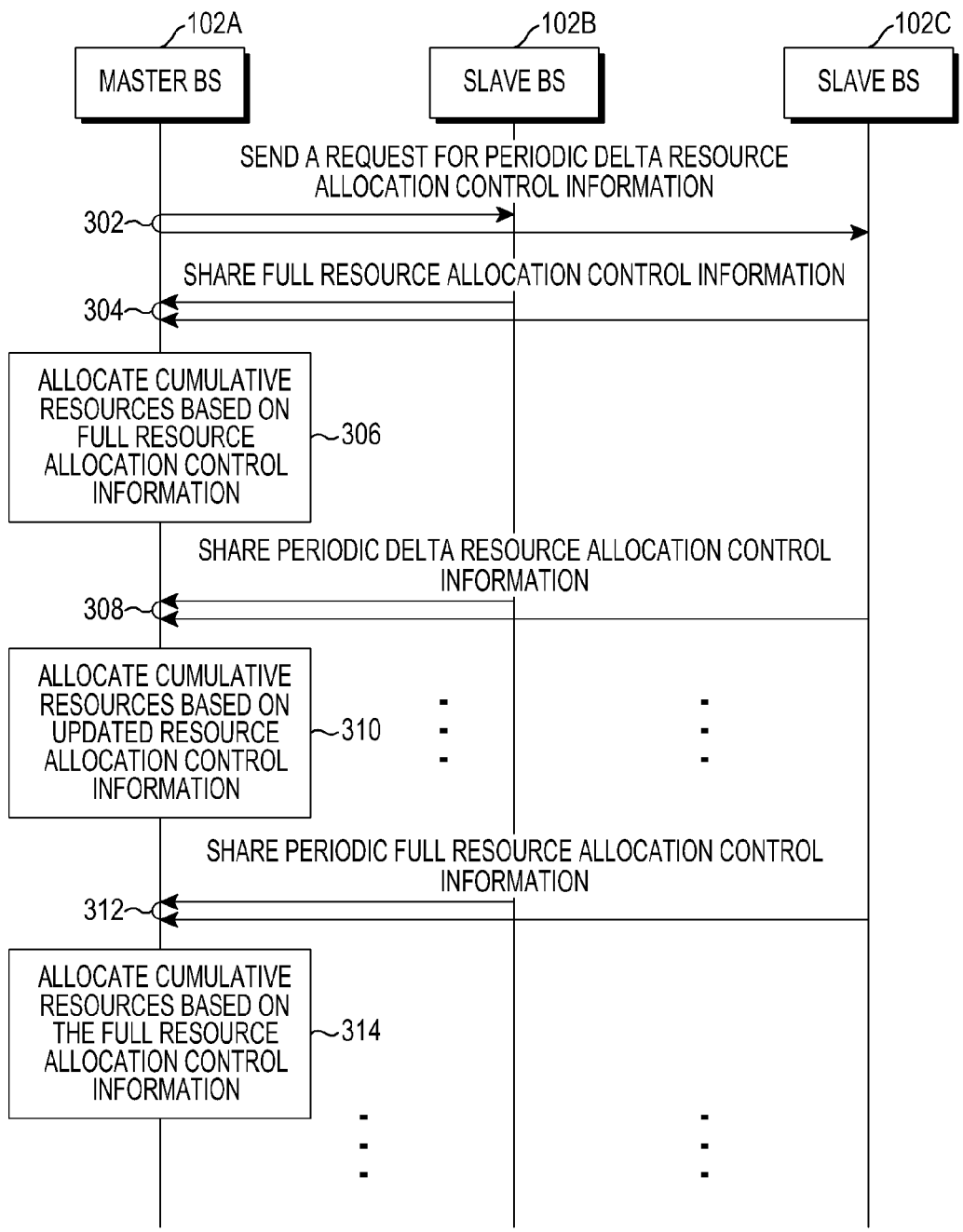
FIG. 3 is a flow diagram illustrating a method of determining resources associated with Base Stations (BSs) available for use during every scheduling interval according to an embodiment of the present disclosure.

FIG. 3 is a flow diagram illustrating a method of determining resources associated with BSs available for use during every scheduling interval according to an embodiment of the present disclosure.

In some embodiments, the master BS 102A receives information on respective resources from the slave BSs 102B and 102C. In these various embodiments, the respective slave BSs 102B and 102C periodically share full resource allocation information with the master BS 102A and share partial resource allocation information when there is a change in resource information. The slave BSs 102B and 102C share the full or delta resource allocation information before every scheduling interval.

Referring to FIG. 3, the master BS 102A sends a request for sharing periodic delta resource allocation information to the slave BSs 102A and 102B respectively at operation 302. At operation 304, the slave BSs 102B and 102C share full resource allocation information with the master BS 102A. At operation 306, the master BS 102A allocates cumulative resources to the mobile station 104 using the full resource allocation information received from the slave BSs 102B and 102C for a first scheduling interval.

At operation 308, the slave BSs 102B and 102C send respective periodic delta resource allocation information to the master BS 102A. The periodic delta resource allocation information may include information associated with resources allocated/freed upon sending the full resource allocation information. At operation 310, the master BS 102A allocates cumulative resources to the mobile station 104 using the full resource allocation information and the periodic delta resource allocation information received from the slave BSs 102B and 102C for a second scheduling interval. The slave BSs 102B and 102C share the respective periodic delta resource allocation information till a point that periodic full resource allocation information is to be shared.

At operation 312, the slave BSs 102B and 102C share periodic full resource allocation information with the master BS 102A. At operation 314, the master BS 102A allocates cumulative resources to the mobile station 104 using the full resource allocation information received from the slave BSs 102B and 102C for a third scheduling interval. Thereafter, the operations 306 to 314 are repeated.

FIG. 4 is a flow diagram 400 illustrating a method of determining resources associated with BSs available for use during every scheduling interval according to an embodiment of the present disclosure.

Referring to FIG. 4, the master BS 102A sends a request for sharing periodic full resource allocation information to the slave BSs 102B and 102C respectively at operation 402. At operation 404, the slave BSs 102B and 102C share full resource allocation information with the master BS 102A. At operation 406, the master BS 102A allocates cumulative resources to the mobile station 104 using the full resource allocation information received from the slave BSs 102B and 102C for a first scheduling interval. The slave BSs 102B and 102C continue to share full resource allocation information to the master BS before every scheduling interval.

It is assumed that the slave BS 102C joins another cloud cell and shares part of its resources with a mobile station in that cloud cell. In such a case, at operation 408, the slave BSs 102B and 102C share the periodic full resource allocation information with the master BS 102A. At operation 410, the master BS 102A allocates cumulative resources to the mobile station 104 based on updated full resource allocation information shared by the slave BSs 102B and 102C.

FIG. 5 is a flow diagram illustrating a method of determining resources associated with BSs available for use during every scheduling interval according to an embodiment of the present disclosure.

In some embodiments, the slave BSs 102B and 102C may provide access to partial or full resources to the master BS 102A. The slave BS 102B/102C may give control to the master BS 102A to manage full resources when the respective slave BS 102B/102C is the sole member of the cloud cell 110A. Alternatively, if the slave BS 102B/102C is a member of two or more cloud cells 110A-N, the respective slave BS 102B/102C gives control to the master BS 102A to manage partial resources. The slave BSs 102B and 102C notify the master BS 102A which of the resources are to be managed through a resource allocation update message. For example, the resource allocation update message may include information on the resources (e.g., partial or full resources) to be managed.

Referring to FIG. 5, the master BS 102A sends a resource allocation request for controlling resources to the slave BSs 102B and 102C respectively at operation 502. At operation 504, the slave BSs 102B and 102C send a resource allocation response indicating whether full or partial resources are to be controlled by the master BS 102A. At operation 506, the master BS 102A allocates cumulative resources to the mobile station 104 based on the resource allocation responses.

It is assumed that the slave BS 102C joins another cloud cell before a second scheduling interval and shares part of its resources with the cloud cell 110B. In such a case, at operation 508, the slave BS 102C sends a resource allocation update to the master BS 102A indicating that the partial resources are shared with the cloud cell 110B. Accordingly, at operation 510, the master BS 102A allocates cumulative resources to the mobile station 104 based on the resource update received from the slave BS 102C.

Figure 6:
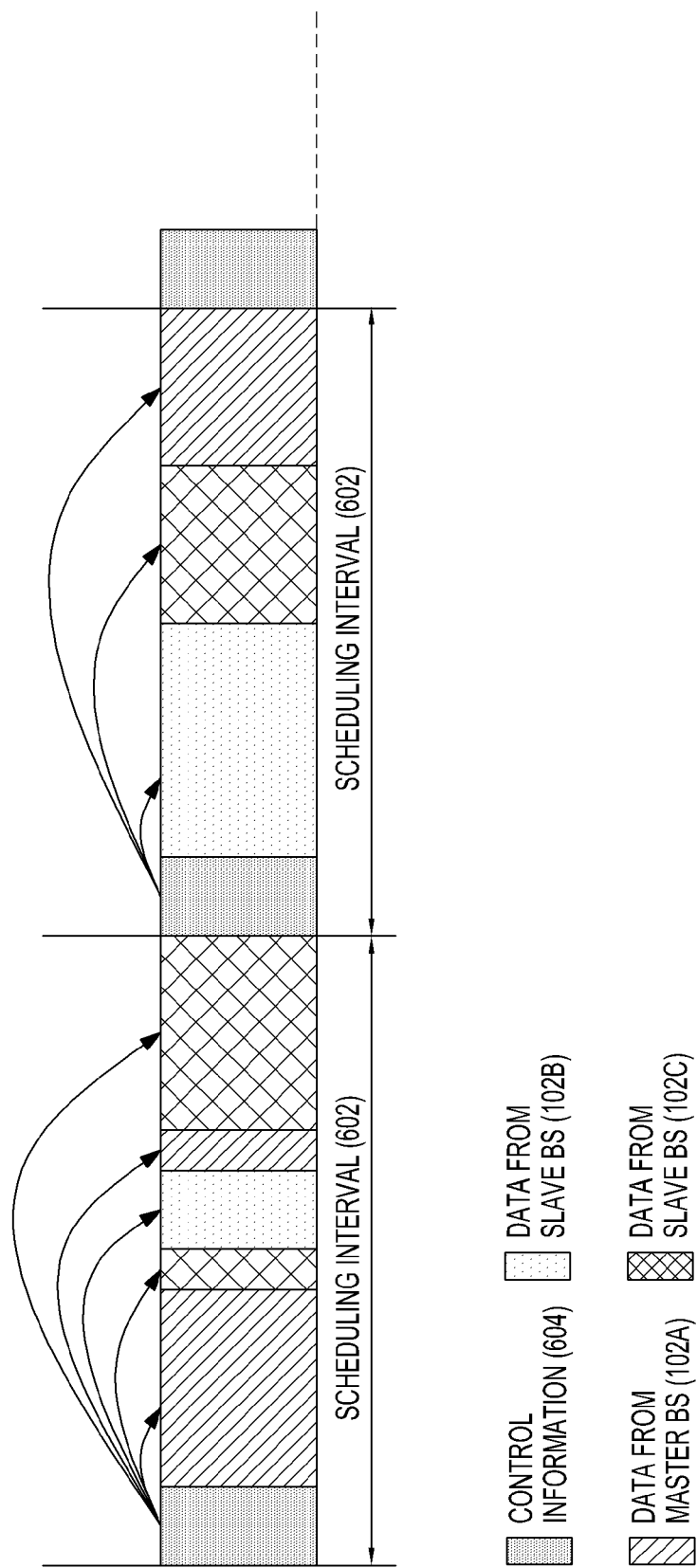
FIG. 6 is a schematic representation depicting resource scheduling on communication links between a mobile station and BSs when the mobile station has a single receive/transmit chain and a scheduling interval is long according to an embodiment of the present disclosure.

FIG. 6 is a schematic representation depicting resource scheduling on communication links between a mobile station and BSs when the mobile station has a single receive/transmit chain and a scheduling interval is long according to an embodiment of the present disclosure.

Referring to FIG. 6, for a long scheduling interval 602, the master BS 102A allocates resources from each of the BSs 102A-C to the mobile station 104 at a time and resources from the BSs 102A-C in a time multiplexed manner within a data portion of the scheduling interval 602. It can be noted that the master BS 102A allocates resources from each of the BSs 102A-C at a time since the mobile station 104 has a single receive chain. Further, the scheduling interval 602 can be divided into one or more time slots. In such a case, the master BS 102A allocates the cumulative resources in granularity of time slots within the data portion of the scheduling interval 602.

As depicted, the master BS 102A transmits resource allocation control information 604 at the start of the scheduling interval 602. Then, the master BS 102A transmits data packet(s) to the mobile station 104 using the associated resources indicated in the resource allocation control information 604. Further, the slave BS 102C transmits data packet(s) to the mobile station 104 using the associated resources indicated in the resource allocation control information 604. Following this, the slave BS 102B transmits data packet(s) to the mobile station 104 using the associated resources indicated in the resource allocation control information 604. Thereafter, the master BS 102A transmits data packet(s) to the mobile station 104 using the associated resources indicated in the resource allocation control information 604. Finally, the slave BS 102C transmits data packet(s) to the mobile station 104 using the associated resources indicated in the resource allocation control information 604. During every scheduling interval 602, the mobile station 104 decodes the resource allocation control information 604 and receives data packets from the BSs 102A-C using the single receive chain at different time instants indicated in the decoded resource allocation control information 604. Similarly, the mobile station 104 transmits data packets to the BSs 102A-C using a single transmit chain at different time instants indicated in the decoded resource allocation control information 604.

Figure 7:
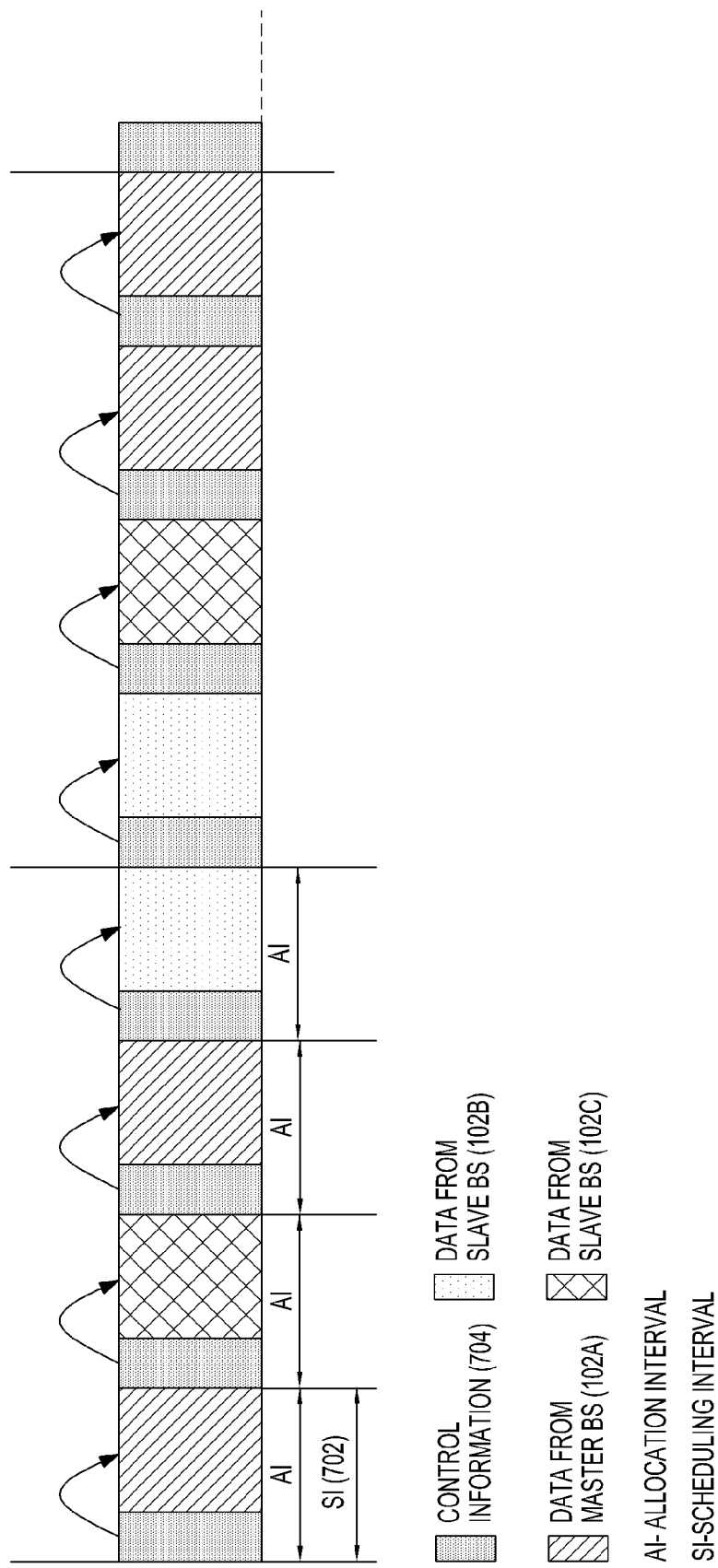
FIG. 7 is a schematic representation depicting resource scheduling on communication links between a mobile station and BSs when the mobile station has a single receive/transmit chain and a scheduling interval is short according to an embodiment of the present disclosure.

FIG. 7 is a schematic representation depicting resource scheduling on communication links between a mobile station and BSs when the mobile station has a single receive/transmit chain and a scheduling interval is short according to an embodiment of the present disclosure.

Referring to FIG. 7, for a short scheduling interval 702, the master BS 102A allocates resources from a single BS (one of the BSs 102A-C) at a time. The master BS 102A allocates resources from the single BS at a time since the mobile station 104 has a single receive chain and the scheduling interval 702 is short. Generally, when the scheduling interval is short and the mobile station 104 has multiple receive chains, the maximum number of BSs from which the downlink resources are allocated for the scheduling interval 702 is equal to the number of receive chains in the mobile station 104.

At the start of every scheduling interval 702, the master BS 102A transmits resource allocation control information 704 which indicates downlink and/or uplink resources from a single BS to the mobile station 104. The allocated resources correspond to an allocation interval 704 associated with the scheduling interval 702. The allocation interval 704 in the downlink is the same as the scheduling interval 704 while the allocation interval 704 in the uplink is at a known offset from the scheduling interval 702. During every scheduling interval 702, the mobile station 104 uses a receive chain to receive the resource allocation control information 704 from the master BS 102A on the associated communication link. It can be noted that the mobile station 104 may also receive data packets from the master BS 102A along with the resource allocation control information 704. The mobile station 104 decodes the resource allocation control information 704 and receives data packets from a BS indicated in the decoded resource allocation control information 704 using the receive chain. Similarly, the mobile station 104 transmits data packets to a BS indicated in the decoded resource allocation control information 704 using the transmit chain.

Figure 8:
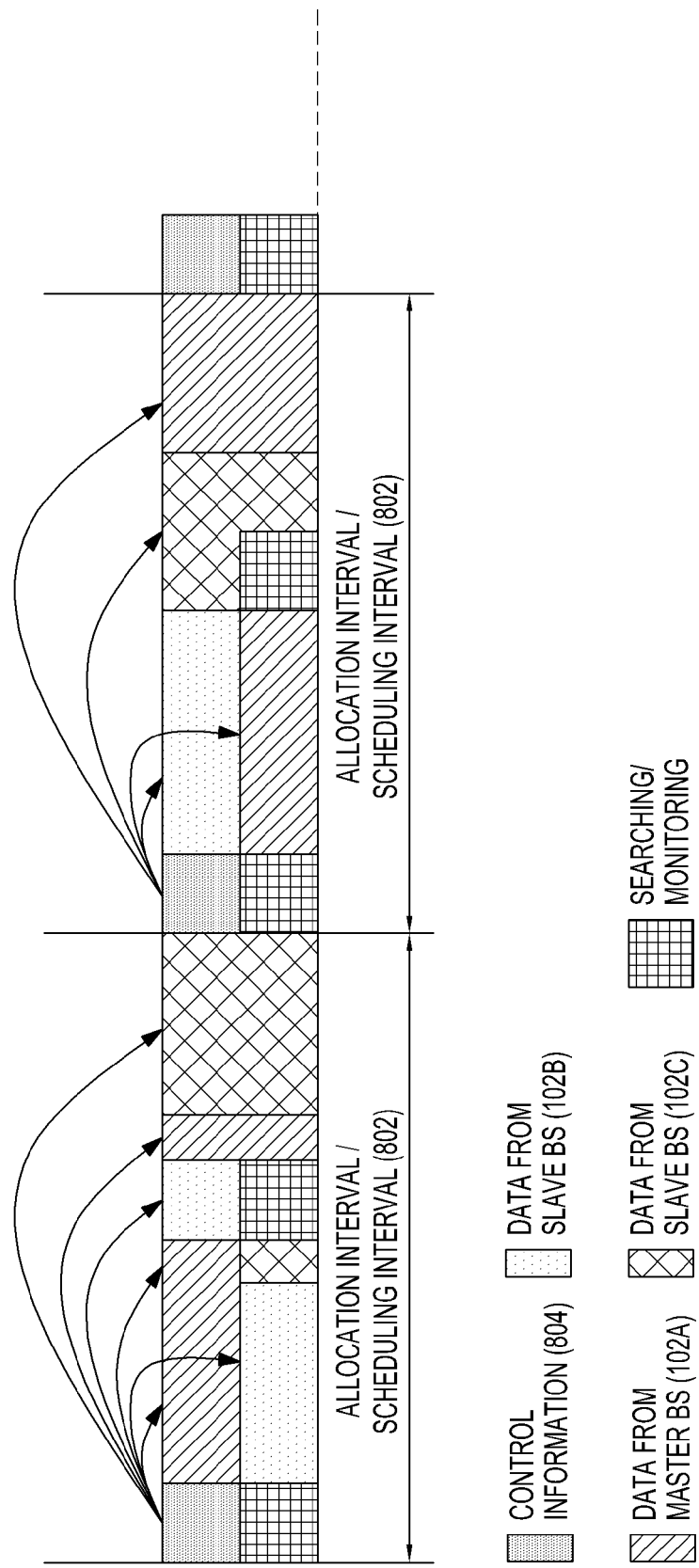
FIG. 8 is a schematic representation depicting resource scheduling on communication links between a mobile station and BSs when the mobile station has multiple receive/transmit chains and a scheduling interval is long according to an embodiment of the present disclosure.

FIG. 8 is a schematic representation depicting resource scheduling on communication links between a mobile station and BSs when the mobile station has multiple receive/transmit chains and a scheduling interval is long according to an embodiment of the present disclosure.

Referring to FIG. 8, for a long scheduling interval 802, the master BS 102A allocates resources from one or more BSs 102A-C in a time multiplexed manner within a data portion of the scheduling interval 802 such that the maximum number of BSs 102A-C corresponding to which the downlink resources are allocated in a time slot of the data portion is less than or equal to a number of receive chains in the mobile station 104. In the case illustrated in FIG. 8, the mobile station 104 has two receive chains and hence the master BS 102A assigns resources from a maximum of two BSs at a time.

At the start of every scheduling interval 802, the master BS 102A transmits resource allocation control information 804 which indicates downlink and/or uplink resources from the BSs 102A-C to the mobile station 104. During every scheduling interval 802, the mobile station 104 uses one receive chain to receive the resource allocation control information 804 from the master BS 102A on the associated communication link. It can be noted that the mobile station 104 may also receive data packets from the master BS 102A along with the resource allocation control information 804. The mobile station 104 decodes the resource allocation control information 804 and receives data packets from the BSs 102A-C indicated in the decoded resource allocation control information 804 at different time instances in the scheduling interval 802 using multiple receive chains. Similarly, the mobile station 104 transmits data packets to the BSs 102A-C indicated in the decoded resource allocation control information 804 at different time instances using the multiple transmit chains. It is understood that the mobile station 104 may use any of the receive chains for searching/monitoring of BSs as and when the receive chains are available and needed.

Figure 9:
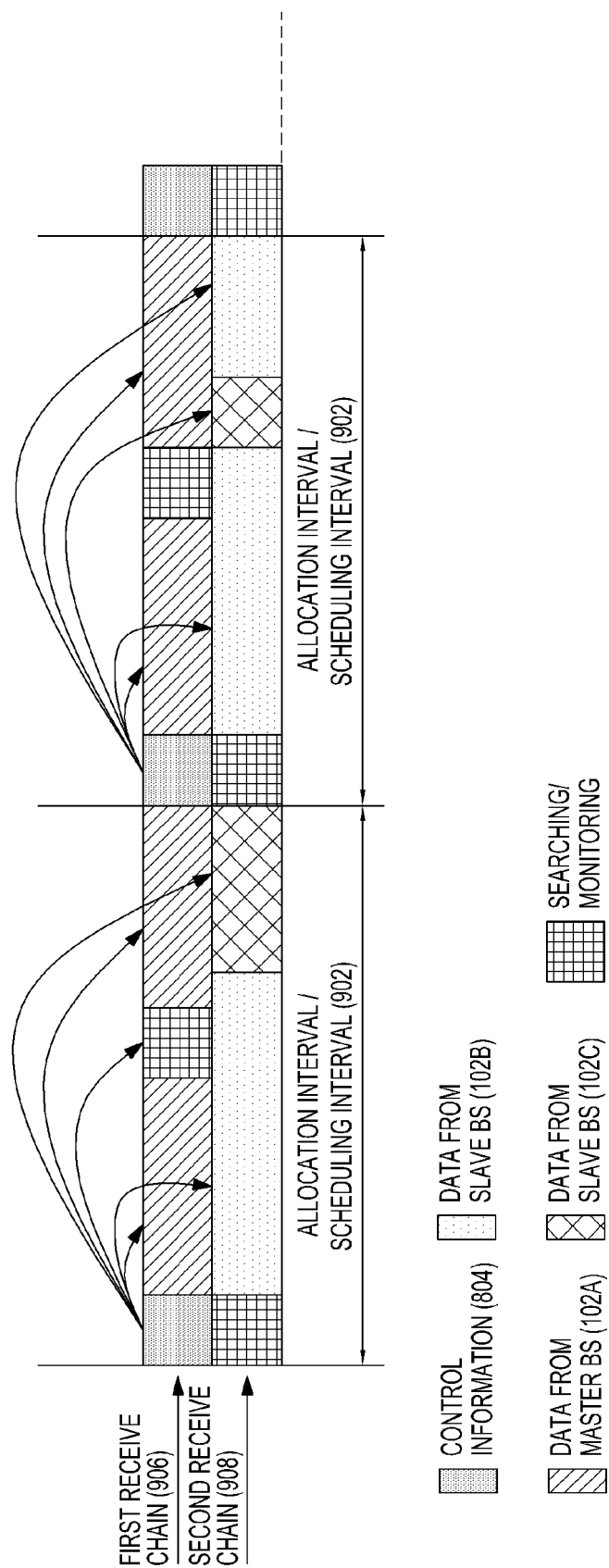
FIG. 9 is a schematic representation depicting resource scheduling on communication links between a mobile station and BSs when the mobile station has multiple receive/transmit chains and a scheduling interval is long according to an embodiment of the present disclosure.

FIG. 9 is a schematic representation depicting resource scheduling on communication links between a mobile station and BSs when the mobile station has multiple receive/transmit chains and a scheduling interval is long according to an embodiment of the present disclosure.

Referring to FIG. 9, for a long scheduling interval 902, the master BS 102A allocates resources from one or more BSs 102A-C in a time multiplexed manner within a data portion of the scheduling interval 902, where one of the multiple receive chains is dedicated for communication with the master BS 102A. The master BS 102A allocates resources from the one or more BSs 102A-C such that the maximum number of BSs 102A-C corresponding to which the downlink resources are allocated in a time slot of the data portion is less than or equal to a number of receive chains in the mobile station 104. In the case illustrated in FIG. 9, the mobile station 104 has two receive chains, wherein the first receive chain 906 is dedicated for receiving control information 904 and data packets from the master BS 102A while the other receive chain 908 is used for receiving data packets from the slave BSs 102B and 102C during every scheduling interval 902.

Figure 10:
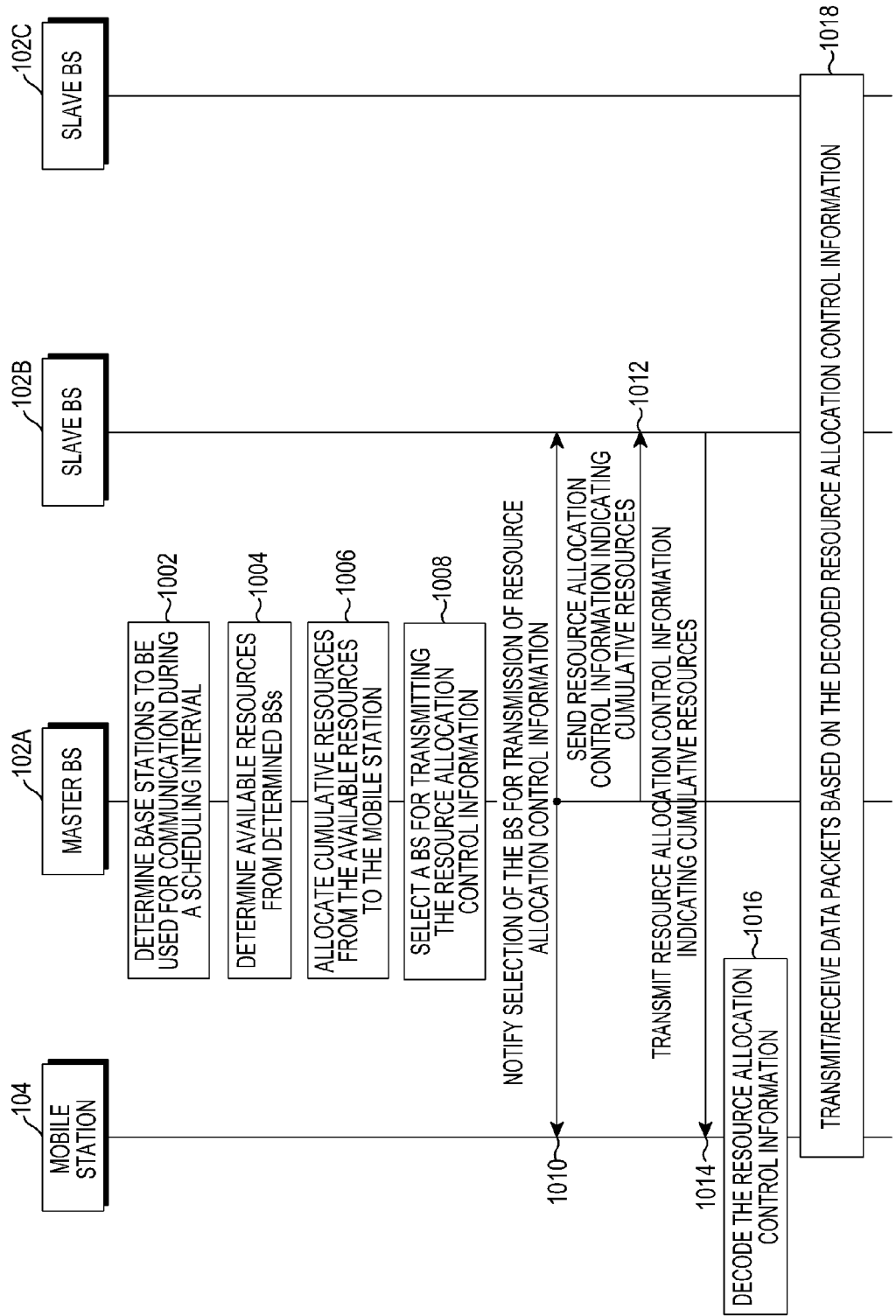
FIG. 10 is a flow diagram illustrating a method of signaling and processing resource allocation control information to a mobile station according to an embodiment of the present disclosure.

FIG. 10 is a flow diagram illustrating a method of signaling and processing resource allocation control information to a mobile station according to another embodiment of the present disclosure.

Referring to FIG. 10, before every scheduling interval, a master BS 102A determines which of the base stations in the cloud cell 110A are to be used for communicating with the mobile station 104 during a scheduling interval, at operation 1002. It is assumed that the master BS 102A determines that the slave BSs 102B and 102C are to be used for communication with the mobile station 104 along with itself. At operation 1004, the master BS 102A determines resources associated with itself, the slave BSs 102B and 102C available for use on respective communication links between the mobile station 104 and the BSs 102A-C during the scheduling interval. Methods of determining resources available for use on communication links between the mobile station 104 and the BSs 102A-C are illustrated in FIGS. 3 to 5.

At operation 1006, the master BS 102A allocates cumulative resources to the mobile station 104 for the scheduling interval from the available resources associated with the master BS 102A, the slave BS 102B, and the slave BS 102C. For example, the cumulative resources may include downlink resources and/or uplink resources from the BSs 102A to 102C assigned for use on respective communication links between the mobile station 104 and the BSs 102A-C. The master BS 102A may allocate uplink resources from the BSs 102A-C to the mobile station 104 based on the number of transmit chains in the mobile station 104. Similarly, the master BS 102A may allocate downlink resources from the BSs 102A-C to the mobile station 104 based on the number of receive chains in the mobile station 104. For example, if the mobile station 104 has a single receive chain, then the master BS 102A allocates the down link resources from each BS in a time slot or multiple BSs 102A-C in a time multiplexed manner within the scheduling interval. Alternatively, when the mobile station 104 has multiple received chains, the master BS 102A may allocate downlink resources from multiple BSs in a time slot or in a time multiplexed manner such that the maximum number of BSs 102A-C corresponding to which the downlink resources are allocated in the time slot is less than or equal to the number of receive chains in the mobile station 104.

At operation 1008, the master BS 102A selects a BS from the slave BSs 102B and 102C for transmitting resource allocation control information which indicates the cumulative resources to the mobile station 104. In some embodiments, the master BS 102A selects one of the slave BSs 102B and 102C based on measurements on quality of communication links between the mobile station 104 and the BSs 102A-C. In these various embodiments, the respective BSs 102A-C and the mobile station 104 perform the measurements of link quality in uplink and downlink respectively. Both the mobile station 104 and the BSs 102B and 102C may communicate the respective measurements of link quality to the master BS 102A. The master BS 102A may use downlink measurements of link quality and/or uplink measurements of link quality for selecting a BS with a best link quality. The master BS 102A may select one of the slave BSs 102B and 102C based on other parameters such as geographical location of BSs 102B and 102C and load sharing conditions in addition to the link quality. For the purpose of illustration, it is assumed that the slave BS 102B is selected for transmission of the resource allocation control information to the mobile station 104. At operation 1010, the master BS 102A notifies selection of the slave BS 102B for transmitting the resource allocation control information to the slave BS 102B and the mobile station 104.

At operation 1012, the master BS 102A sends the resource allocation control information associated with the BSs 102A-C to the slave BS 102B. At operation 1014, the slave BS 102B transmits the resource allocation control information to the mobile station 104 on a communication link between the mobile station 104 and the slave BS 102B. At operation 1016, the mobile station 104 decodes the received cumulative resource allocation control information. At operation 1018, the mobile station 104 and the base stations 102A-C exchange data packets according to the decoded resource allocation control information during the scheduling interval. If the mobile station 104 has a single receive chain, then the mobile station 104 receives data packets from each of the BSs 102A to 102C according to the decoded resources allocation control information using the single receive chain. Alternatively, if the mobile station 104 has multiple receive chains, the mobile station 104 receives data packets from the BSs 102A to 102C according to the decoded resources allocation control information using the multiple receive chains. In some embodiments, when the mobile station 104 has multiple receive chains, the mobile station 104 may use a dedicated receive chain for receiving control information and/or data packets from the master BS 102A and remaining receive chain(s) for receiving data packets from the slave BSs 102B and 102C.

Figure 11A:
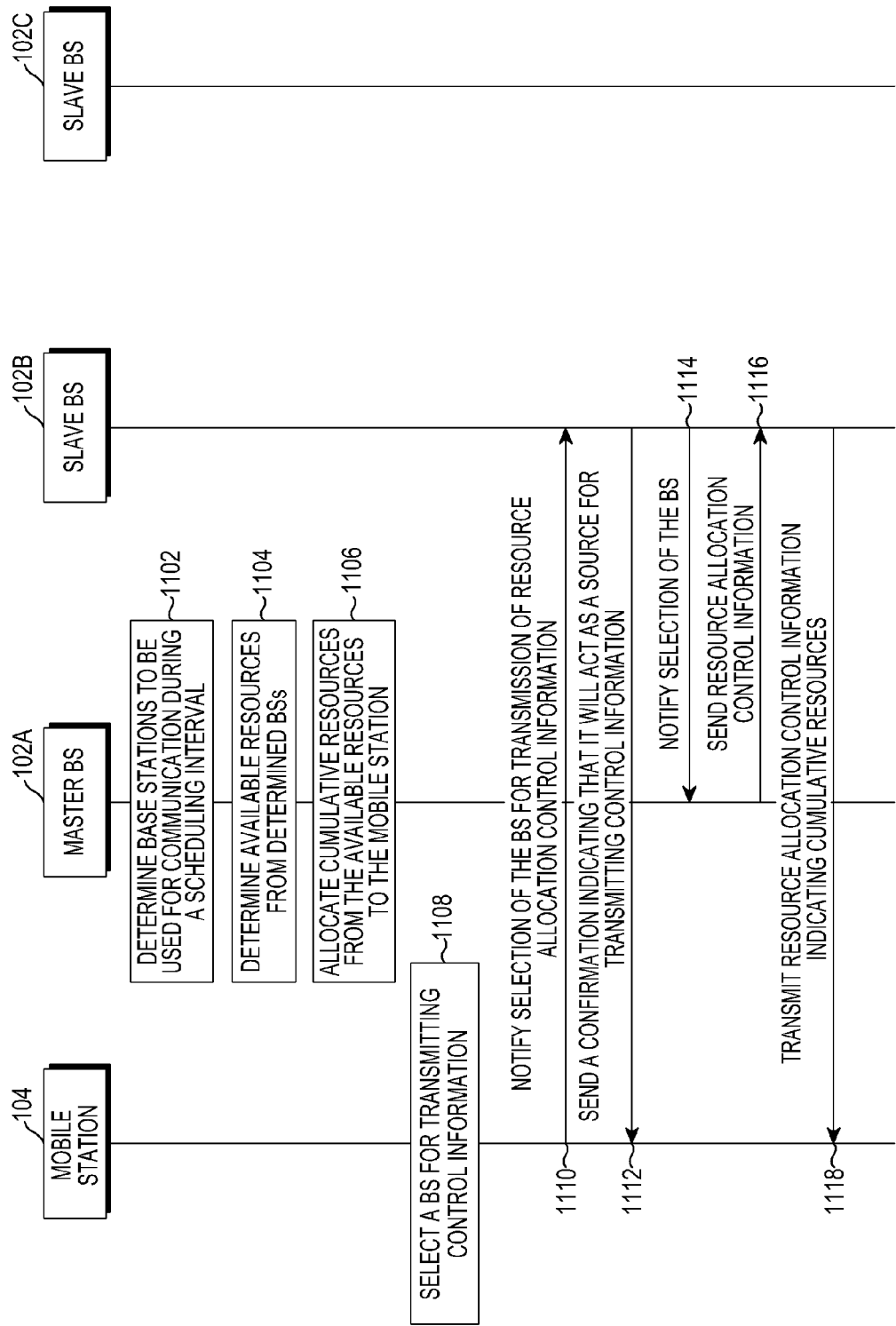
FIG. 11A is a flow diagram illustrating a method of signaling and processing resource allocation control information to a mobile station according to an embodiment of the present disclosure.

FIG. 11A is a flow diagram illustrating a method of signaling and processing resource allocation control information to a mobile station according to an embodiment of the present disclosure.

Referring to FIG. 11A, before every scheduling interval, a master BS 102A determines which of the base stations in the cloud cell 110A are to be used for communicating with the mobile station 104 during a scheduling interval, at operation 1102. It is assumed that the master BS 102A determines that the slave BSs 102B and 102C are to be used for communication with the mobile station 104 along with itself. At operation 1104, the master BS 102A determines resources associated with itself, the slave BSs 102B and 102C available for use on respective communication links between the mobile station 104 and the BSs 102A-C during the scheduling interval. Methods of determining resources available for use on communication links between the mobile station 104 and the BSs 102A-C are illustrated in FIGS. 3 to 5.

At operation 1106, the master BS 102A allocates cumulative resources to the mobile station 104 for the scheduling interval from the available resources associated with the master BS 102A, the slave BS 102B, and the slave BS 102C. For example, the cumulative resources may include downlink resources and/or uplink resources from the BSs 102A to 102C assigned for use on respective communication links between the mobile station 104 and the BSs 102A-C.

It is assumed that the communication link between the master BS 102A and the mobile station 104 temporarily goes down. Also, it is assumed that the master BS 102A has not yet notified selection of another BS for transmitting resource allocation control information which indicates the cumulative resources allocated to the mobile station 104. At operation 1108, the mobile station 104 selects a BS from the slave BSs 102B and 102C for transmitting the resource allocation control information. In some embodiments, the mobile station 104 selects one of the slave BSs 102B and 102C based on measurements on quality of a communication link between the mobile station 104 and the BSs 102A-C. It is assumed that the mobile station 104 selects the slave BS 102B. Although, the above operation 1108 describes selection of a BS when the communication link is between the master BS 102A and the mobile station 104 goes down (i.e., becomes unreliable), one skilled in the art can envision that the mobile station 104 may select a BS even when the communication link between a BS, previously selected for transmitting the resource allocation control information, and the mobile station 104 goes down (i.e., becomes unreliable).

Figure 11B:
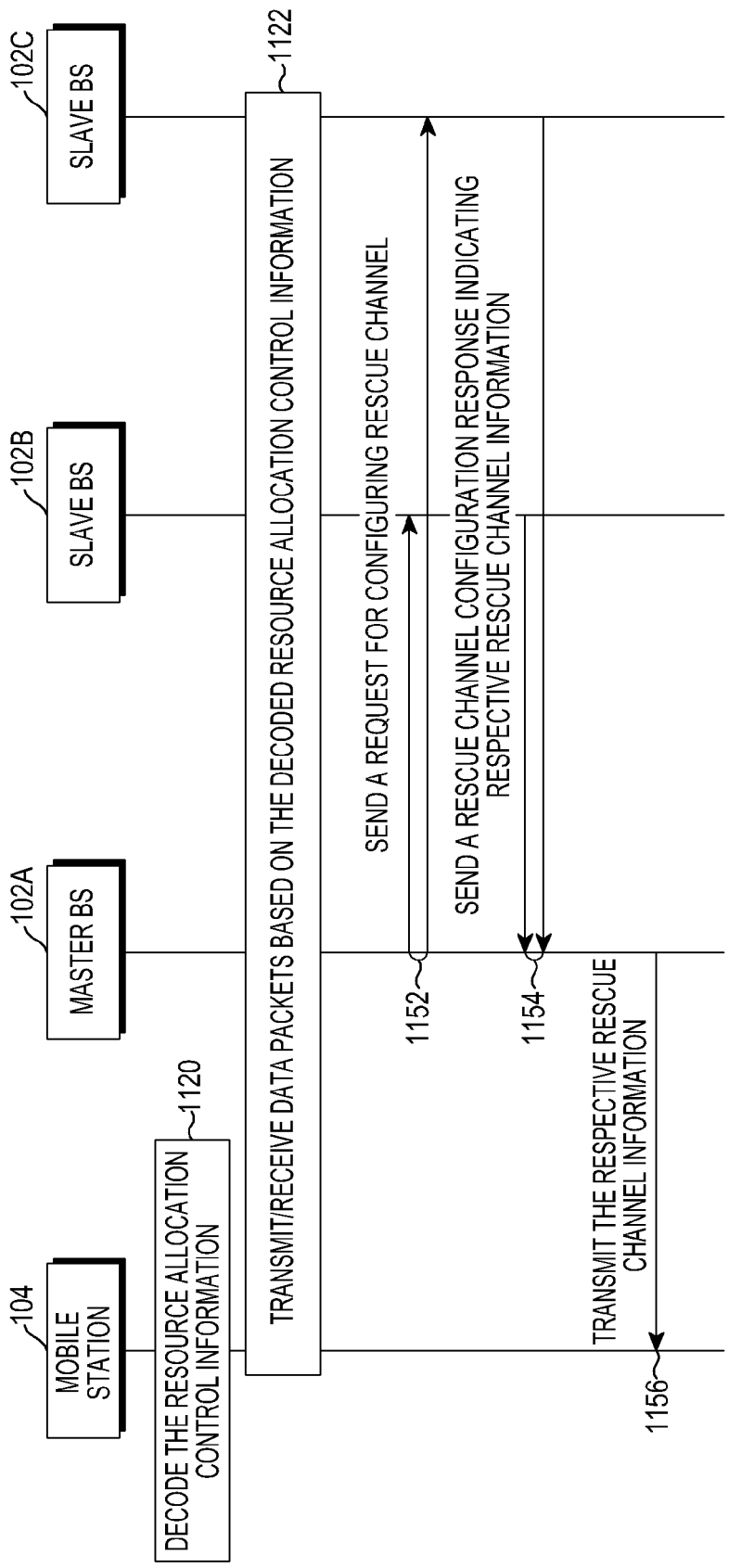
FIG. 11B is a flow diagram illustrating a method of configuring a rescue channel associated with slave BSs according to an embodiment of the present disclosure.

At operation 1110, the mobile station 104 notifies selection of the slave BS 102B for transmitting the resource allocation control information to the slave BS 102B. In some embodiments, the mobile station 104 notifies selection of the slave BS 102B using a rescue channel A rescue channel is a dedicated control channel associated with the BSs 102B and 102C in the cloud cell 110A. The rescue channel can be in the form of a dedicated rescue code and a dedicated or common rescue opportunity. It is understood that a rescue code and a rescue opportunity are similar to ranging codes and a ranging opportunity used in wireless communication systems such as Worldwide Interoperability for Microwave Access (WiMAX), Third Generation Partnership Project (3GPP), and the like. The process of providing rescue channel information associated with slave BSs 102B and 102C to the mobile station 104 is illustrated in FIG. 11B.

In an implementation, when the communication link goes down, the mobile station 104 selects one of the BSs 102B and 102C based on measurements of link quality and sends a dedicated rescue code at a dedicated/common rescue opportunity. At operation 1112, the selected BS (e.g., the slave BS 102B) sends a confirmation to the mobile station 104 indicating that it will act as a source of transmission for the resource allocation control information via a rescue response channel. At operation 1114, the slave BS 102B notifies selection of the slave BS 102B for transmitting the resource allocation control information by the mobile station 104 to the master BS 102A.

At operation 1116, the master BS 102A sends the resource allocation control information associated with the BSs 102A-C to the slave BS 102B. At operation 1118, the slave BS 102B transmits the resource allocation control information to the mobile station 104 on a communication link between the mobile station 104 and the slave BS 102B. At operation 1120, the mobile station 104 decodes the received cumulative resource allocation control information. At operation 1122, the mobile station 104 and the base stations 102A-C transmit/receive data packets according to the decoded resource allocation control information during the scheduling interval. If the mobile station 104 has a single receive chain, then the mobile station 104 receives data packets from each of the BSs 102A to 102C according to the decoded resource allocation control information using the single receive chain. Alternatively, if the mobile station 104 has multiple receive chains, the mobile station 104 receives data packets from the BSs 102A to 102C according to the decoded resources allocation control information using the multiple receive chains. In some embodiments, when the mobile station 104 has multiple receive chains, the mobile station 104 may use a dedicated receive chain for receiving control information and/or data packets from the master BS 102A and remaining receive chain(s) for receiving data packets from the slave BSs 102B and 102C.

One skilled in the art will realize that the above described method of operations 1102 to 1122 are applicable especially when the communication link between the master BS 102A and the mobile station 104 is temporarily broken. In such a case, instead of switching a role of master to another BS, the other BS is selected for transmitting resource allocation control information by the mobile station 104. Thus, unnecessary overhead involved in switching the role of master from a master BS to a slave BS is significantly reduced. In case the communication link between the master BS 102A and the mobile station 104 is broken for a duration longer than a preconfigured threshold, the BS 102B selected for transmitting the resource allocation control information may be awarded a role of a master. Alternatively, the selected BS can become a master if the BS provides a pre-configured number of consecutive transactions to the mobile station 104. Further, if the communication link between the master BS 102A and the mobile station 104 is lost for a pre-configured number of times in a pre-configured time interval, a new master is selected in the cloud cell.

FIG. 11B is a flow diagram illustrating a method of configuring a rescue channel associated with slave BSs according to an embodiment of the present disclosure.

Referring to FIG. 11B, the master BS 102A sends a request for configuring a rescue channel associated with the slave BS 102B and the slave BS 102C at operation 1152. At operation 1154, each of the slave BSs 102B and 102C sends a rescue channel configuration response including associated rescue code and rescue opportunity to the master BS 102A. At operation 1156, the master BS 102A sends rescue channel information including a rescue channel code and a rescue opportunity associated with the slave BSs 102B and 102C. In an alternative method, the slave BSs 102B and 102C share associated rescue channel information with the master BS 102A upon joining the cloud cell 110A.

FIG. 12 is a flow diagram illustrating a method of signaling and processing resource allocation control information to a mobile station according to an embodiment of the present disclosure.

Referring to FIG. 12, before every scheduling interval, a master BS 102A determines which of the base stations in the cloud cell 110A are to be used for communicating with the mobile station 104 during a scheduling interval, at operation 1202. It is assumed that the master BS 102A determines that the slave BSs 102B and 102C are to be used for communication with the mobile station 104 along with itself. At operation 1204, the master BS 102A determines resources associated with itself and the slave BSs 102B and 102C available for use on respective communication links between the mobile station 104 and the BSs 102A-C during the scheduling interval. Methods of determining resources available for use on communication links between the mobile station 104 and the BSs 102A-C are illustrated in FIGS. 3 to 5.

At operation 1206, the master BS 102A allocates cumulative resources to the mobile station 104 for the scheduling interval from the available resources associated with the master BS 102A, the slave BS 102B and the slave BS 102C. For example, the cumulative resources may include downlink resources and/or uplink resources from the BSs 102A to 102C assigned for use on respective communication links between the mobile station 104 and the BSs 102A-C.

At operation 1208, the master BS 102A determines which of the BSs in the cloud cell 110A would be used for transmitting resource allocation control information which indicates the cumulative resources along with itself. It can be noted that the master BS 102A selects the BSs for transmitting the resource allocation control information based on quality of a communication link between the mobile station 104 and the BSs 102B and 102C. Further, the BSs selected for transmitting the resource allocation control information during the previous scheduling interval may dynamically change for the next scheduling interval. It is also possible that a single BS be selected for transmitting the resource allocation control information to the mobile station 104. For the purpose of illustration, it is assumed that the master BS 102A selects the slave BSs 102B and 102C. At operation 1210, the master BS 102A computes timing and order in which each of the BSs 102A-C needs to transmit the resource allocation control information to the mobile station 104. At operation 1212, the master BS 102A sends the resource allocation control information, timing and order of transmission, a range, and a validity period to the slave BSs 102B and 102C. The range may indicate a scheduling interval for which the timing and order of transmission is applicable. The validity period may indicate repetitions of the range for which the timing and order is valid.

At operation 1214, the master BS 102A sends the timing and order of transmission of the resource allocation control information, the range, and the validity period to the mobile station 104. Alternatively, the timing and order of transmission of the resource allocation control information, the validity period and the range is sent to the mobile station 104 by another BS selected by the master BS 102A. In an embodiment, the timing and order of transmission, a validity period, and a range are sent in a pre-assigned time frequency resource with pre-specified PHY layer parameters (e.g., a Modulation and Coding Scheme). For the mobile station 104 with a single receive chain, the resources for downlink data are not assigned by a BS other than the master BS 102A during a slot or symbols in which the timing and order of transmission is transmitted. For the mobile station 104 with multiple receive chains, the resources for downlink data can be assigned by any BS in the cloud cell 110A during a slot or symbols in which the timing and order of transmission is transmitted depending on the number of receive chains supported by the mobile station such that one receive chain is used for decoding the timing and order of transmission by the mobile station 104. In another embodiment, the timing and order of transmission, the range and the validity period is sent in a signaling message to the mobile station 104. The timing and order of transmission, a range, and a validity period are herein after referred to as 'pre-control information'. In some embodiments, the pre-control information is sent to the mobile station 104 in a first occurrence of a resource allocation control region of the master BS 102A within a first range of the validity period, wherein the first resource allocation control region in the range is from the master BS 102A.

It can be noted that BSs involved in transmitting resource allocation control information may change dynamically based on a condition of the communication link between the mobile station 104 and the BSs 102A-C. The master BS 102A may coordinate with the mobile station 104 and/or the slave BSs 102B and 102C to determine the BSs 102B and 102C which are going to transmit the resource allocation control information.

The pre-control information may also indicate the list of BSs 102A-C which will transmit the resource allocation control information to the mobile station 104. In an embodiment, the pre-control information may indicate one base station which includes the master BS 102A. If the link with the master BS 102A is not good, then the master BS 102A may select another BS for transmitting the resource allocation control information as indicated in the pre-control information. In that case, the reliability of transmission cannot be ensured through the single BS transmitting the resource allocation control information. As such, the master BS 102A may select multiple BSs for transmitting cumulative resource allocation control information and indicate the BSs selected for transmitting the cumulative resource allocation control information in the pre-control information. It can be noted that the master BS 102A may not send the timing and order of transmission to the mobile station 104 if the number of receive chains in the mobile station 104 is more than or equal to the number of BSs that are required to transmit the resource allocation control information and the BSs are required to transmit the resource allocation control information simultaneously.

At operation 1216, each of the master BS 102A, the slave BS 102B, and the slave BS 102C transmits the resource allocation control information to the mobile station 104 over the respective communication link in the pre-defined order and timing. It can be noted that the BSs 102A-C transmits the resource allocation control information before the start of data packet transmission. At operation 1218, the mobile station 104 decodes the cumulative resource allocation control information received from one of the BSs 102A-C. At operation 1220, the mobile station 104 and the base stations 102A-C exchange data packets according to the decoded resource allocation control information during the scheduling interval. The above method ensures that the mobile station 104 receives the resource allocation control information even in case of failure of a communication link between the mobile station 104 and the master BS 102A.

FIGS. 13A and 13B are schematic representations depicting transmitting of resource allocation control information to a mobile station by multiple BSs during a scheduling interval according to an embodiment of the present disclosure.

Referring to FIGS. 13A and 13B, the master BS 102A sends a timing and transmission order 1302 to the mobile station 104 at the start of the validity period 1310. The transmission order indicates the order in which the resource allocation control information 1304 will be transmitted by the BSs 102A-C. The timing information indicates the time at which each of the BSs 102A-C are going to transmit the resource allocation control information 1304 to the mobile station 104. The range 1306 may indicate a scheduling interval for which the timing and order of transmission is applicable. The validity period 1310 may indicate repetitions of the range for which the timing and order is valid. For example, in FIG. 13A, the validity period is applicable for single range 1306, while the validity period 1310 is applicable for two ranges 1306 in FIG. 13B.

The mobile station 104 looks for the resource allocation control information 1304 in a predefined order and timing indicated by the master BS 102A. Then, the mobile station 104 decodes the resource allocation control information 1304 received from one of the BSs 102A-C and receives data packets from the BSs 102A-C during the scheduling interval 1308 according to the decoded resource allocation control information 1304.

Figure 14A:
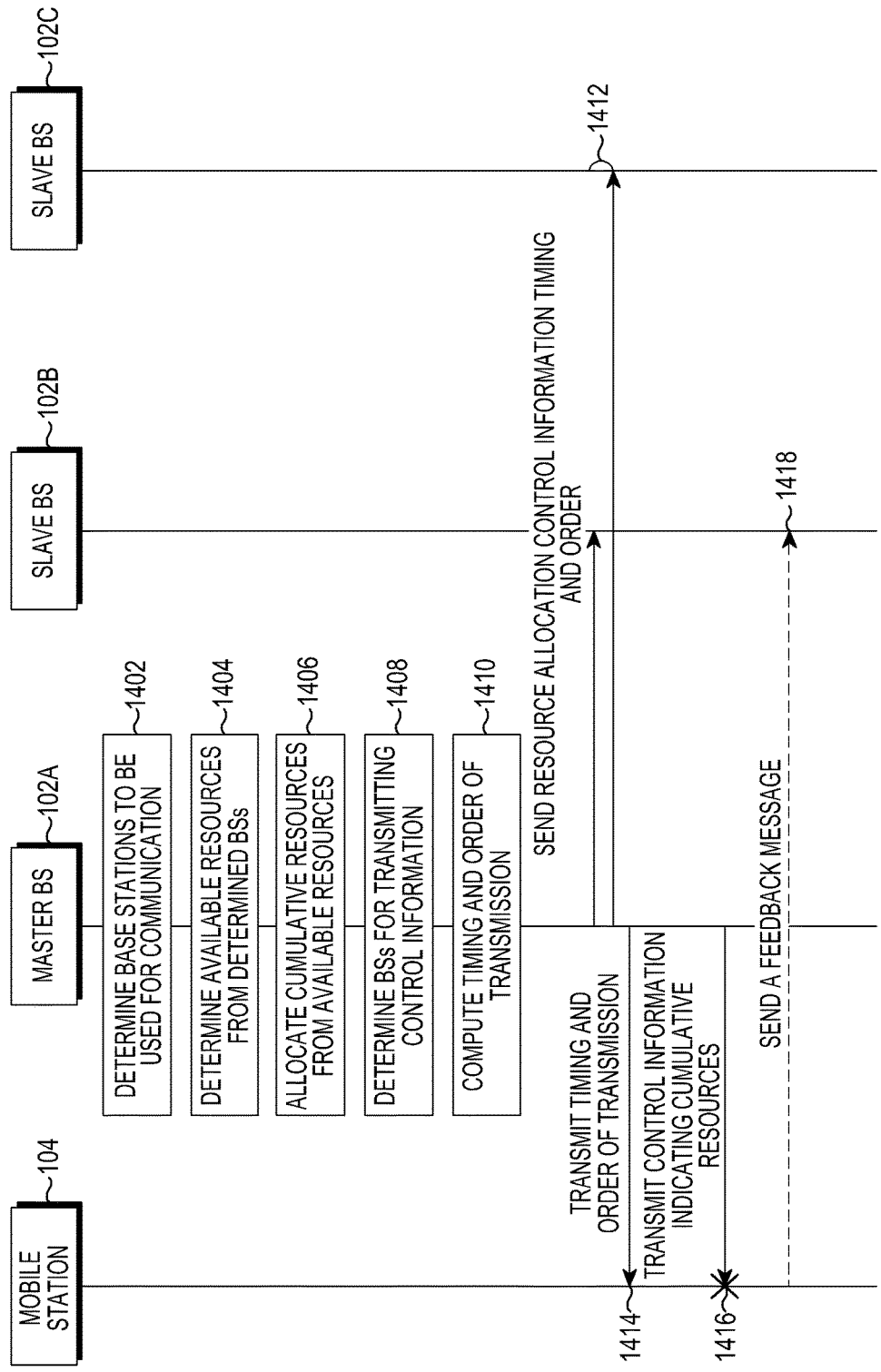
FIGS. 14A and 14B are a flow diagram illustrating a method of signaling and processing resource allocation control information to a mobile station according to another embodiment of the present disclosure.
Figure 14B:
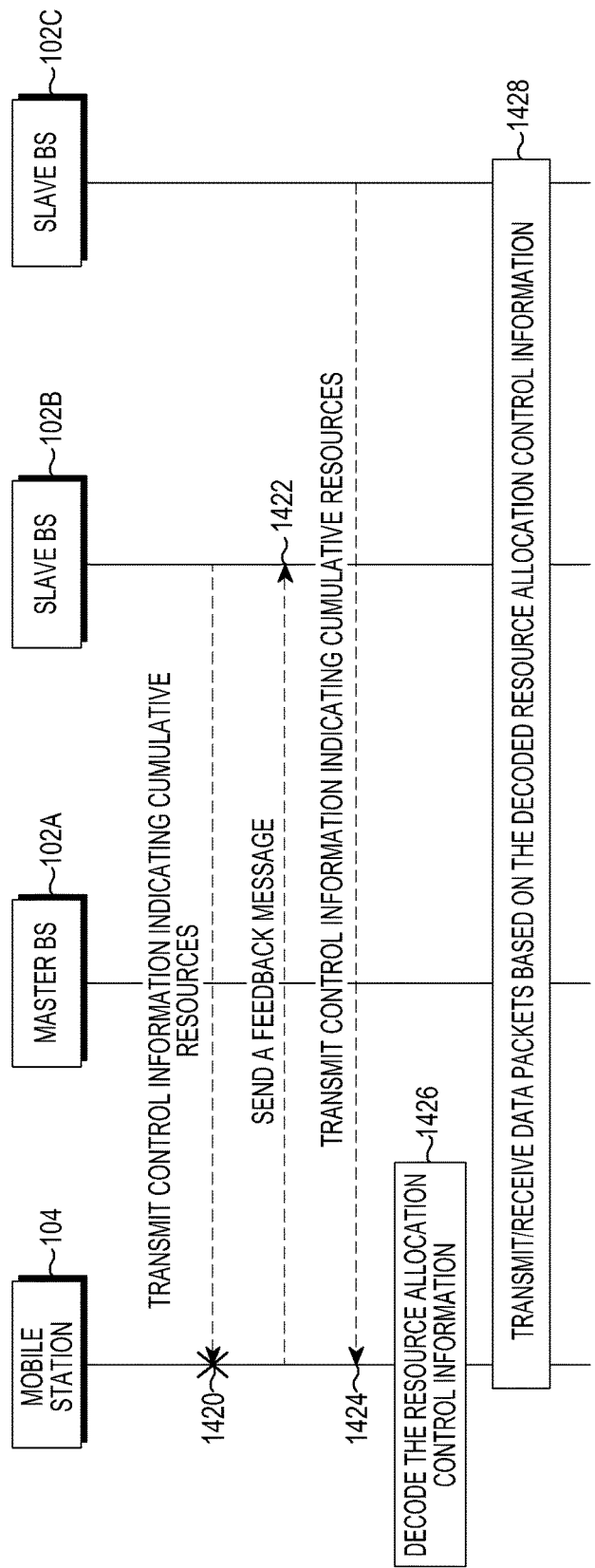

FIGS. 14A and 14B are a flow diagram illustrating a method of signaling and processing resource allocation control information to a mobile station according to an embodiment of the present disclosure.

Referring to FIGS. 14A and 14B, before every scheduling interval, a master BS 102A determines which of the base stations in the cloud cell 110A are to be used for communicating with the mobile station 104 during a scheduling interval, at operation 1402. It is assumed that the master BS 102A determines that the slave BSs 102B and 102C are to be used for communication with the mobile station 104 along with itself. At operation 1404, the master BS 102A determines resources associated with itself and the slave BSs 102B and 102C available for use on respective communication links between the mobile station 104 and the BSs 102A-C during the scheduling interval. Methods of determining resources available for use on communication links between the mobile station 104 and the BSs 102A-C are illustrated in FIGS. 3 to 5.

At operation 1406, the master BS 102A allocates cumulative resources to the mobile station 104 for the scheduling interval from the available resources associated with the master BS 102A, the slave BS 102B and the slave BS 102C. For example, the cumulative resources may include downlink resources and/or uplink resources from the BSs 102A to 102C assigned for use on respective communication links between the mobile station 104 and the BSs 102A-C.

At operation 1408, the master BS 102A determines which of the BSs in the cloud cell 110A would be used for transmitting resource allocation control information which indicates the cumulative resources along with itself. It can be noted that the master BS 102A selects the BSs for transmitting the resource allocation control information based on quality of a communication link between the mobile station 104 and the BSs 102B and 102C. Further, the BSs selected for transmitting the resource allocation control information during the previous scheduling interval may dynamically change for a next scheduling interval. For the purpose of illustration, it is assumed that the master BS 102A selects the slave BSs 102B and 102C. At operation 1410, the master BS 102A computes a timing and order in which each of the BSs 102A-C needs to transmit the resource allocation control information to the mobile station 104. At operation 1412, the master BS 102A sends the resource allocation control information, timing, and order of transmission to the slave BSs 102B and 102C.

At operation 1414, the master BS 102A sends the timing and order of transmission of the resource allocation control information to the mobile station 104. Alternatively, the timing and order of transmission of the resource allocation control information is sent to the mobile station 104 by another BS selected by the master BS 102A. It can be noted that the master BS 102A may not send the timing and order of transmission to the mobile station 104 if the number of receive chains in the mobile station 104 is more than or equal to the number of BSs that are required to transmit the resource allocation control information and the BSs are required to transmit the resource allocation control information simultaneously.

At operation 1416, the master BS 102A transmits the resource allocation control information to the mobile station 104 over the respective communication link in the predefined order and timing. At operation 1426, the mobile station 104 decodes the cumulative resource allocation control information received from one of the BSs 102A-C. If the mobile station 104 has successfully decoded the resource allocation control information, then at operation 1428, the mobile station 104 and the base stations 102A-C transmit/receive data packets according to the decoded resource allocation control information during the scheduling interval.

If the mobile station 104 fails to decode the resource allocation control information, then at operation 1418, the mobile station 104 sends a feedback message to the master BS 102A or a next BS indicated in a predefined order (e.g., the slave BS 102B) indicating that the resource allocation control information received from the master BS 102A cannot be successfully decoded. At operation 1420, the slave BS 102B transmits the resource allocation control information to the mobile station 104 in response to the feedback message. The mobile station 104 repeats the operation 1426 in which the resource allocation control information received from the slave BS 102B is decoded. If the mobile station 104 fails to decode the resource allocation control information received from the slave BS 102B, then at operation 1422, the mobile station 104 sends a feedback message to the slave BS 102B or the slave BS 102C, otherwise operation 1426 is performed. Accordingly, at operation 1424, the slave BS 102C transmits the resource allocation control information to the mobile station 104 in response to the feedback message. The mobile station 104 then repeats the operations 1426 and 1428. In this manner, the above method ensures that the resource allocation control information is reliably transmitted to the mobile station 104. It can be noted that, in order to start transmission of data packets, the mobile station 104 need to reliably decode the resource allocation control information. Once the resource allocation control information is successfully decoded, the mobile station 104 can receive data packets from the BSs 102A-C according to the decoded resource allocation control information as described above.

Figure 15:
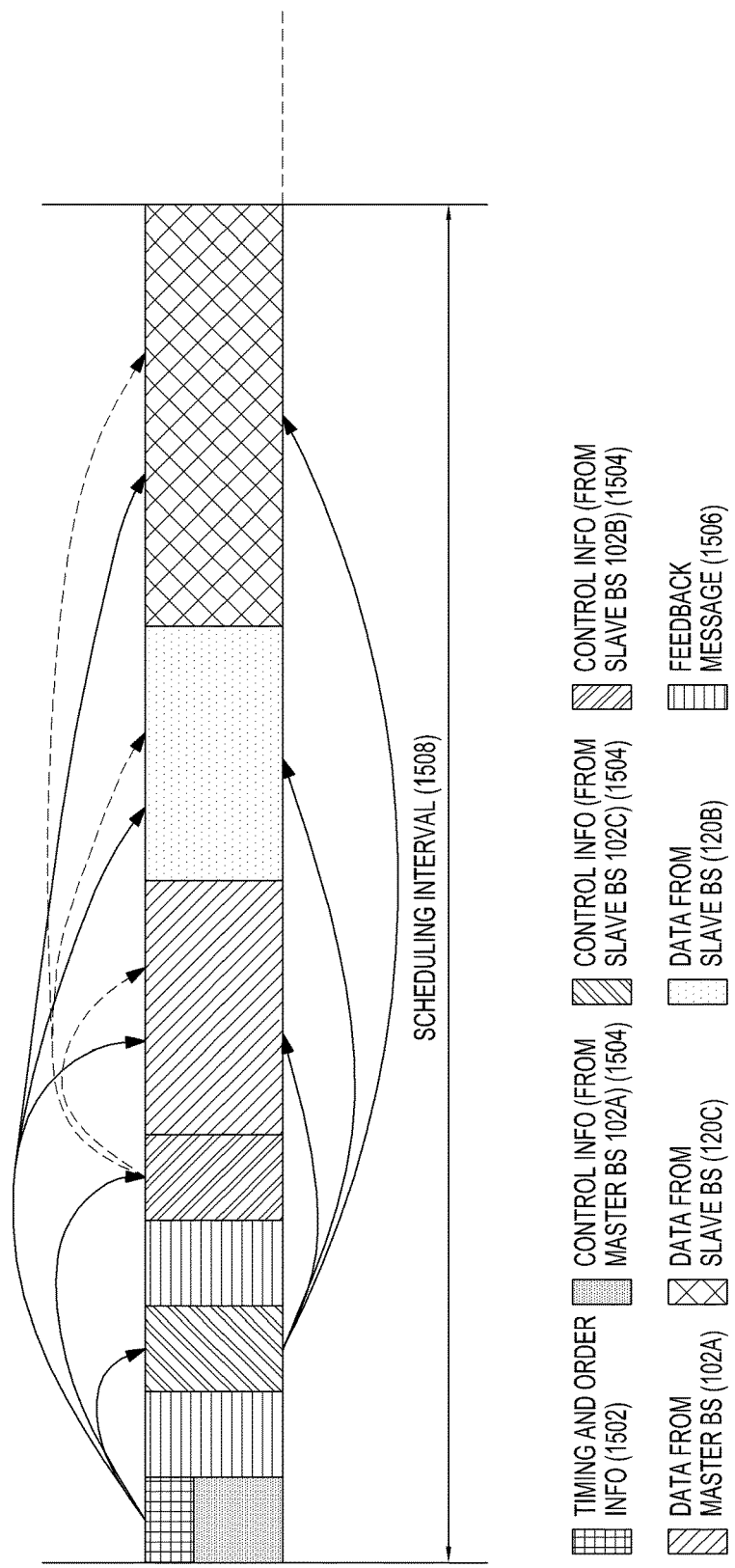
FIG. 15 is a schematic representation depicting transmitting of resource allocation control information to a mobile station by BSs during a scheduling interval according to an embodiment of the present disclosure.

FIG. 15 is a schematic representation depicting transmitting of resource allocation control information to a mobile station by BSs during a scheduling interval according to an embodiment of the present disclosure.

Referring to FIG. 15, the master BS 102A sends a timing and transmission order 1502 to the mobile station 104. The transmission order indicates the order in which the resource allocation control information 1504 will be transmitted by the BSs 102A-C. The timing information indicates the time at which each of the BSs 102A-C are going to transmit the resource allocation control information 1504 to the mobile station 104.

At first, the mobile station 104 receives the resource allocation control information 1504 from the master BS 102A. If the mobile station 104 fails to decode the resource allocation control information, the mobile station 104 sends a feedback message 1506 to the master BS 102A or the next BS in the predefined order (e.g., the slave BS 102B). The feedback message 1506 indicates that the mobile station 104 failed to decode the resource allocation control information 1504 received from the master BS 102A. In response to the feedback message 1506, the slave BS 102B transmits the resource allocation control information 1504 to the mobile station 104.

If the mobile station 104 again fails to decode the resource allocation control information, the mobile station 104 sends a feedback message 1506 to the slave BS 102B or the next BS in the predefined order (e.g., the slave BS 102C) indicating that the resource allocation control information cannot be successfully decoded. Accordingly, the slave BS 102C transmits the resource allocation control information 1504 to the mobile station 104. If the mobile station 104 is able to successfully decode the resource allocation control information 1504, the mobile station 104 receives data packets from the BSs 102A-C during the scheduling interval 1508 according to the decoded resource allocation control information.

Figure 16A:
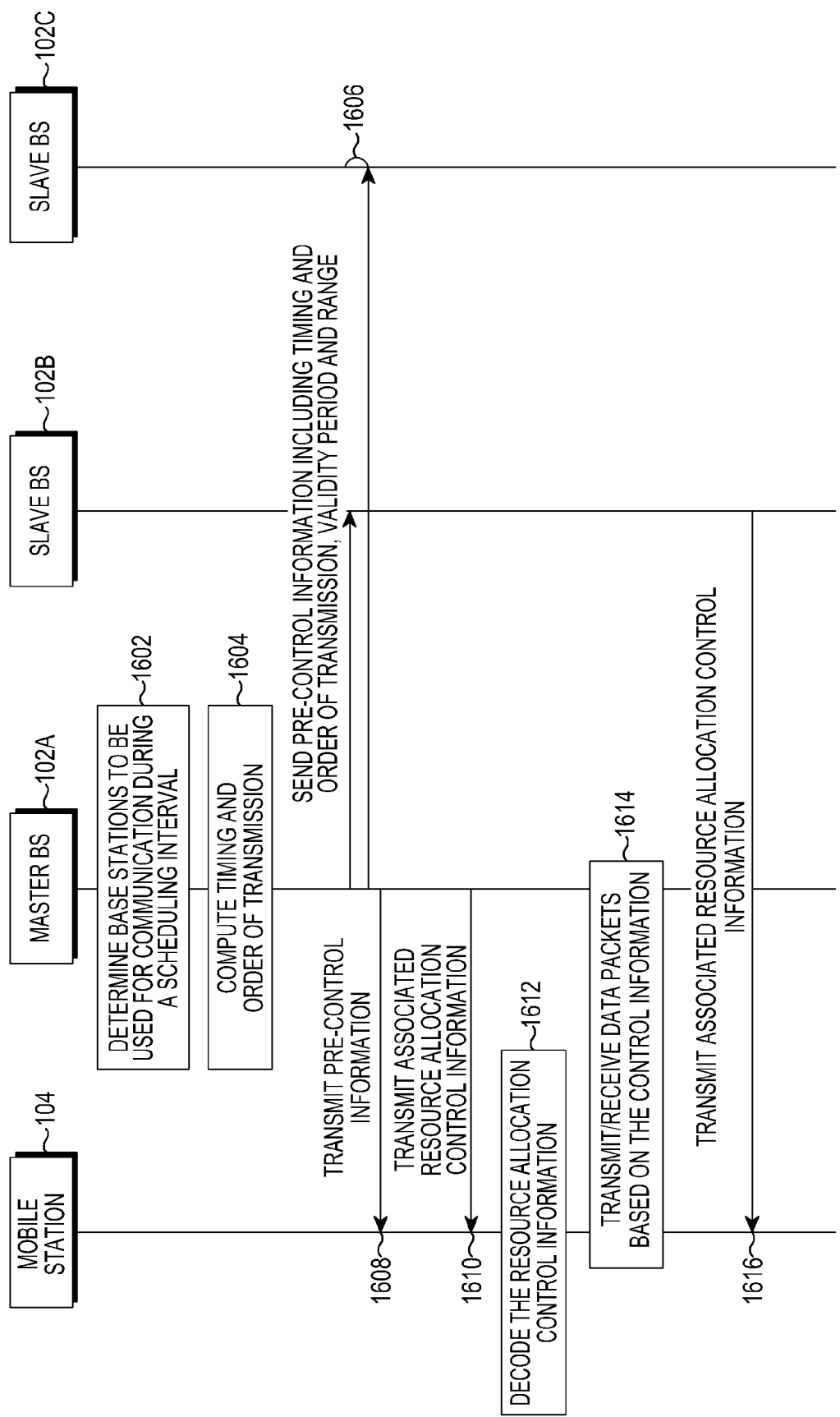
FIGS. 16A and 16B are a flow diagram illustrating a method of signaling and processing resource allocation control information to a mobile station, according to an embodiment of the present disclosure.
Figure 16B:
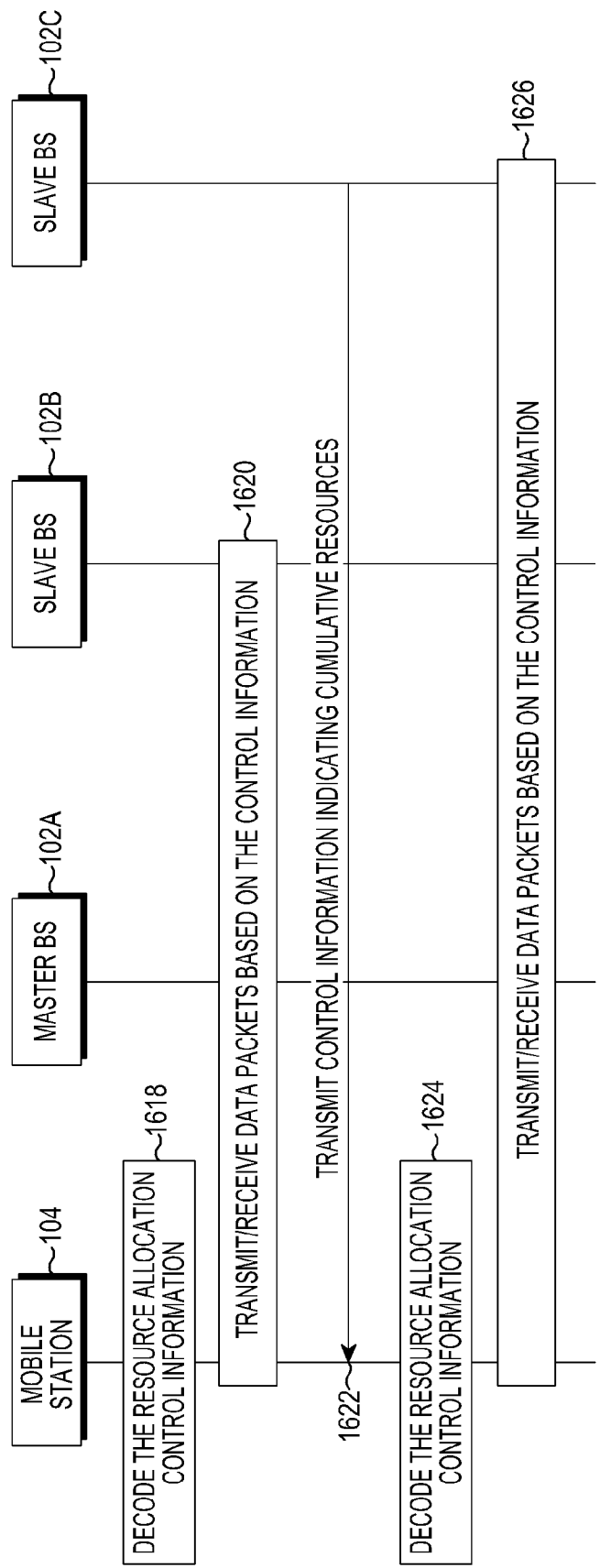

FIGS. 16A and 16B are is a flow diagram illustrating a method of signaling and processing resource allocation control information to the mobile station 104 according to an embodiment of the present disclosure.

Referring to FIGS. 16A and 16B, before every scheduling interval, a master BS 102A determines which of the base stations in the cloud cell 110A are to be used for communicating with the mobile station 104 during a scheduling interval, at operation 1602. It is assumed that the master BS 102A determines that the slave BSs 102B and 102C are to be used for communication with the mobile station 104 along with itself. At operation 1604, the master BS 102A computes a timing and order in which each of the BSs 102A-C needs to transmit the resource allocation control information to the mobile station 104. Also, the master BS 102A sets a validity period and range for which the timing and order is applicable. The range may indicate one or more scheduling intervals for which the timing and order of transmission is applicable. The validity period may indicate repetitions of the range for which the timing and order is valid.

At operation 1606, the master BS 102A sends pre-control information including a list of BSs that are going to transmit respective resource allocation control information, the timing and order of transmission, the validity period, and the range to the slave BSs 102B and 102C. At operation 1608, the master BS 102A sends pre-control information including a list of BSs that are going to transmit respective resource allocation control information, the timing and order of transmission, the validity period, and the range to the mobile station 104. Alternatively, the pre-control information is sent to the mobile station 104 by another BS selected by the master BS 102A.

In an embodiment, the pre-control information is sent in pre-assigned time frequency resource with pre-specified PHY layer parameters (e.g., Modulation and Coding Scheme). For the mobile station 104 with a single receive chain, the resources for downlink data are not assigned by a BS other than the master BS 102A during a slot or symbols in which the pre-control information is transmitted. For the mobile station 104 with multiple receive chains, the resources for downlink data can be assigned by any BS in the cloud cell 110A during a slot or symbols in which the pre-control information is transmitted, depending on the number of receive chains supported by the mobile station, such that one receive chain is used for decoding the pre-control information by the mobile station 104. In another embodiment, the pre-control information is sent in a signaling message to the mobile station 104.

In some embodiments, the pre-control information is sent to the mobile station 104 before the start of the validity period unless the validity period is set to one scheduling interval. For example, the pre-control information may be sent in a first occurrence of a resource allocation control region of the master BS 102A within a first range of the validity period. Further, pre-control information for a next validity period is sent in a last resource allocation control region of a last range of the previous validity period. The last resource allocation control region in the last range can be from any BS (e.g., the BSs 102A-C) in the cloud cell 110A. However, if no resources are assigned for the mobile station 104 in the resource allocation control region by the master BS 102A, the mobile station 104 cannot receive any data in the first scheduling interval as a next resource allocation control region is at the start of next scheduling interval. Alternatively, the pre-control information is sent in more than one resource allocation control region of the last range of the validity period. This helps increase the reliability in receiving pre-control information by the mobile station 104. In other embodiments, the master BS 102A may not send the pre-control information to the mobile station 104 if the number of receive chains in the mobile station 104 is more than or equal to the number of BSs that are required to transmit respective resource allocation control information and the BSs are required to transmit the respective resource allocation control information simultaneously.

At operation 1610, the master BS 102A transmits associated resource allocation control information to the mobile station 104 over the respective communication link as per the pre-control information. At operation 1612, the mobile station 104 decodes the resource allocation control information received from the master BS 102A. At operation 1614, the mobile station 104 receives/transmits data packets from the master BS 102A according to the decoded resource allocation control information during the scheduling interval. It can be noted that, if the mobile station 104 has multiple receive chains, the mobile station 104 may use a dedicated receive chain for receiving pre-control information and/or data packets from the master BS 102A.

At operation 1616, the slave BS 102B transmits associated resource allocation control information to the mobile station 104 over the respective communication link as per the pre-control information. At operation 1618, the mobile station 104 decodes the resource allocation control information received from the slave BS 102B. At operation 1620, the mobile station 104 receives/transmits data packets from the slave BS 102B according to the decoded resource allocation control information during the scheduling interval.

At operation 1622, the slave BS 102C transmits associated resource allocation control information to the mobile station 104 over the respective communication link as per the pre-control information. At operation 1624, the mobile station 104 decodes the resource allocation control information received from the slave BS 102C. At operation 1626, the mobile station 104 receives/transmits data packets from the slave BS 102C according to the decoded resource allocation control information during the scheduling interval.

FIGS. 17A and 17B are schematic representations depicting communication of pre-control information from a master BS before the start of every validity period according to an embodiment of the present disclosure.

Referring to FIG. 17A, the pre-control information 1702 is valid for a single pre-control information range 1704. Referring to FIG. 17B, the pre-control information 1702 is valid for three pre-control information ranges 1704. The master BS 102A transmits pre-control information 1702 before the start of every validity period 1706 unless the validity period 1706 is set to one scheduling interval 1708.

Figure 18:
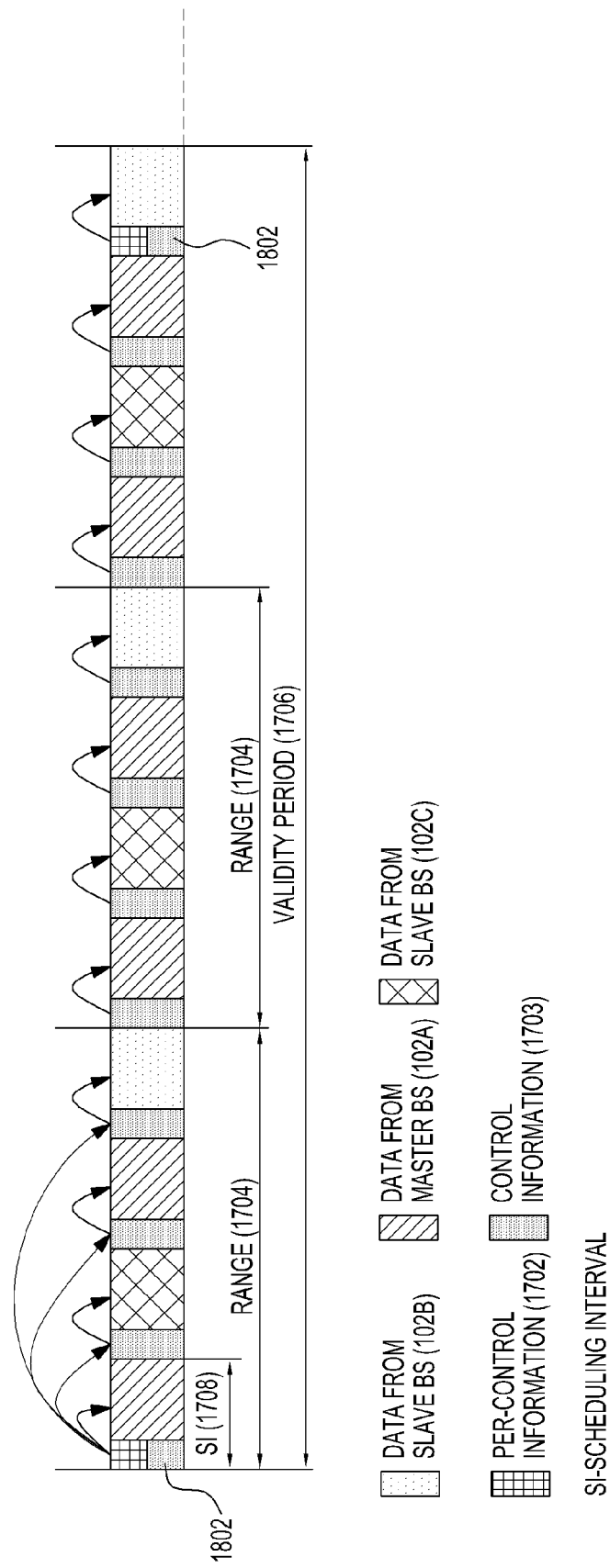
FIG. 18 is a schematic representation depicting an alternate way of communicating pre-control information from a master BS before the start of every validity period according to an embodiment of the present disclosure.

FIG. 18 is a schematic representation depicting an alternate way of communicating pre-control information from a master BS before the start of every validity period according to an embodiment of the present disclosure.

Referring to FIG. 18, the master BS 102A sends the pre-control information 1702 in the first occurrence of a resource allocation control region 1802 in a first range 1704 of the validity period 1706. Further, the master BS 102A sends the pre-control information 1702 for a next validity period in a last resource allocation control region 1802 in a last range 1704 of the validity period 1706.

Figure 19:
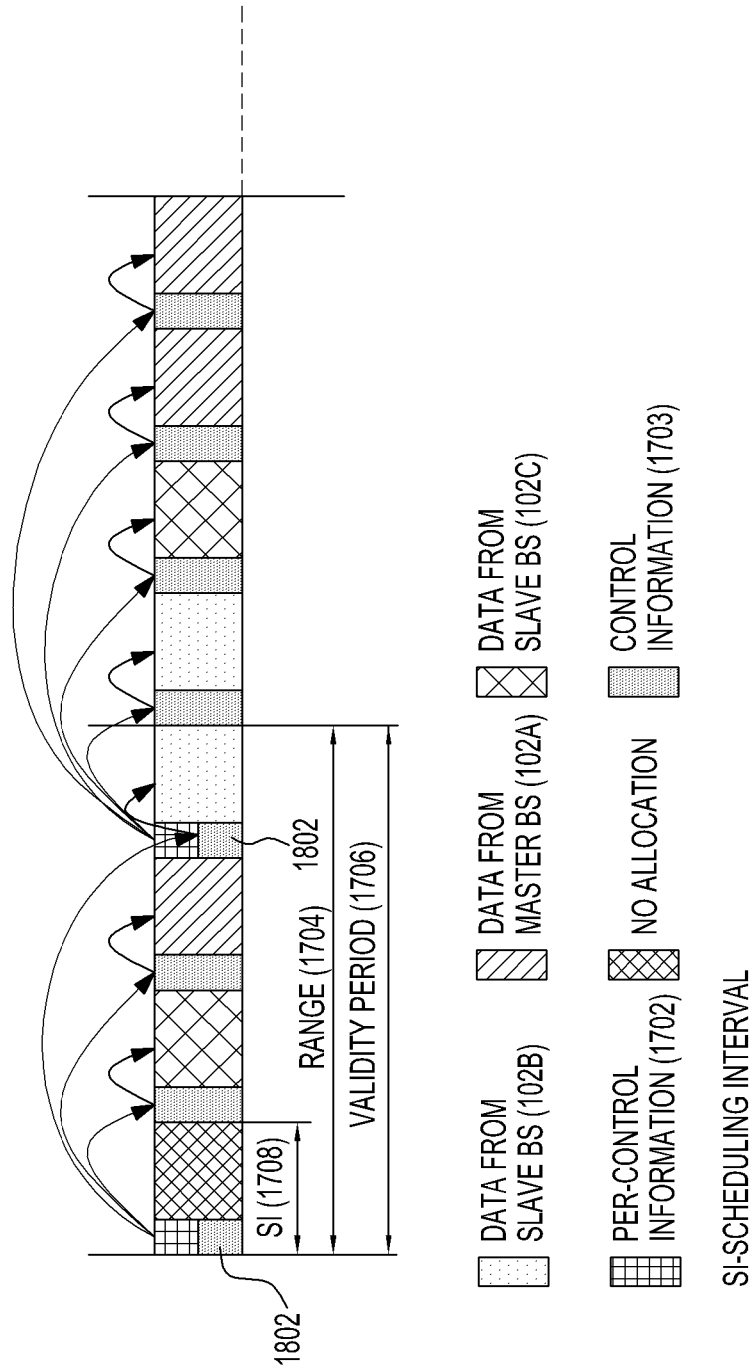
FIG. 19 is a schematic representation depicting an alternate way of communicating pre-control information from a master BS before the start of every validity period according to an embodiment of the present disclosure.

FIG. 19 is a schematic representation depicting an alternate way of communicating pre-control information from a master BS before the start of every validity period according to an embodiment of the present disclosure.

Referring to FIG. 19, the mobile station 104 does not receive the pre-control information 1702 in the first scheduling interval 1708 as the master BS 102A has not assigned any resources for itself in the first resource allocation control region 1802. The mobile station 104 receives the pre-control information 1702 in the next resource allocation control region 1802 in the next scheduling interval 1708.

Figure 20:
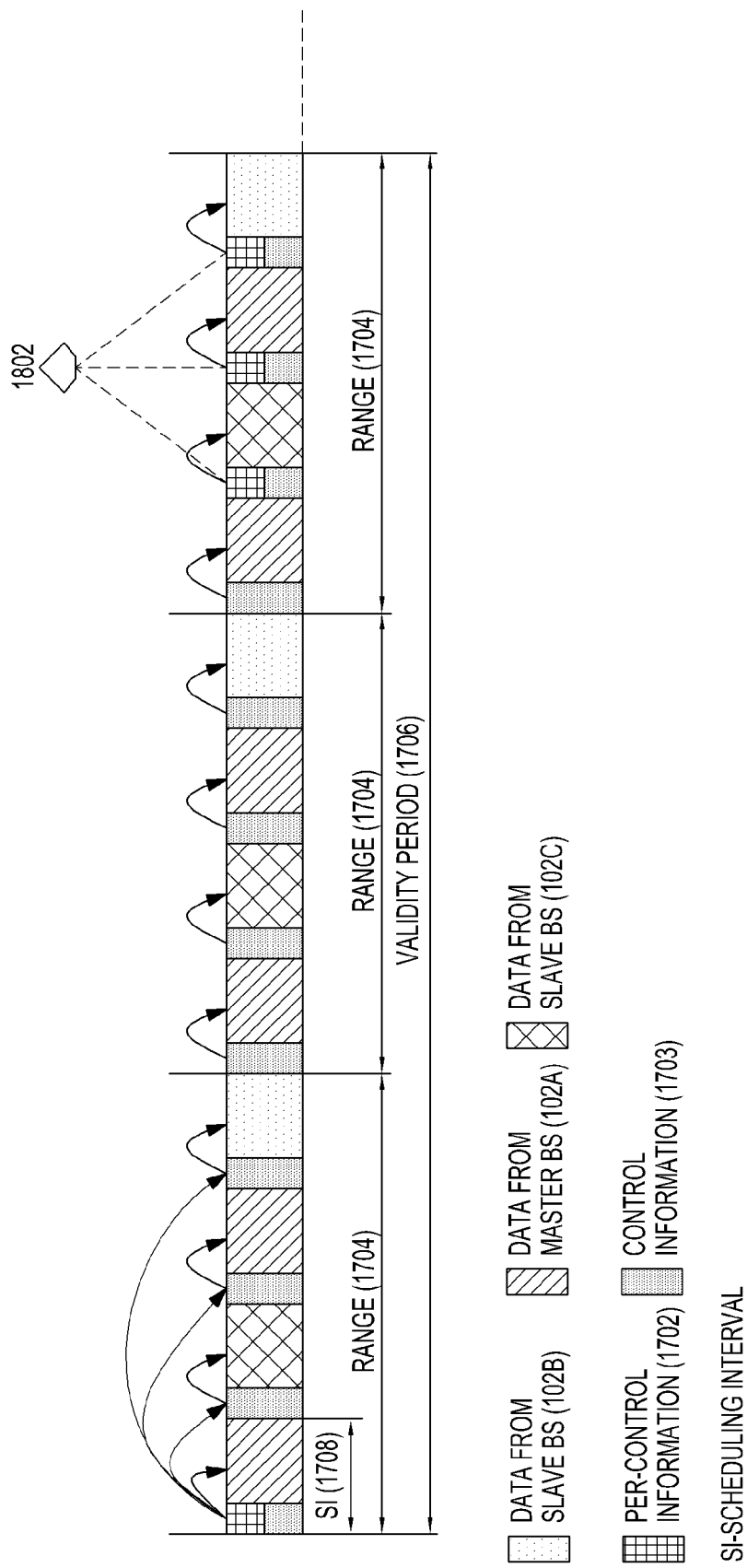
FIG. 20 is a schematic representation depicting an alternate way of communicating pre-control information from a master BS before the start of every validity period according to an embodiment of the present disclosure.

FIG. 20 is a schematic representation depicting an alternate way of communicating pre-control information from a master BS before the start of every validity period according to an embodiment of the present disclosure.

Referring to FIG. 20, the master BS 102A transmits the pre-control information 1702 for next validity period 1706 in more than one resource allocation control region 1802 of the last range 1704 of the previous validity period 1706.

Figure 21:
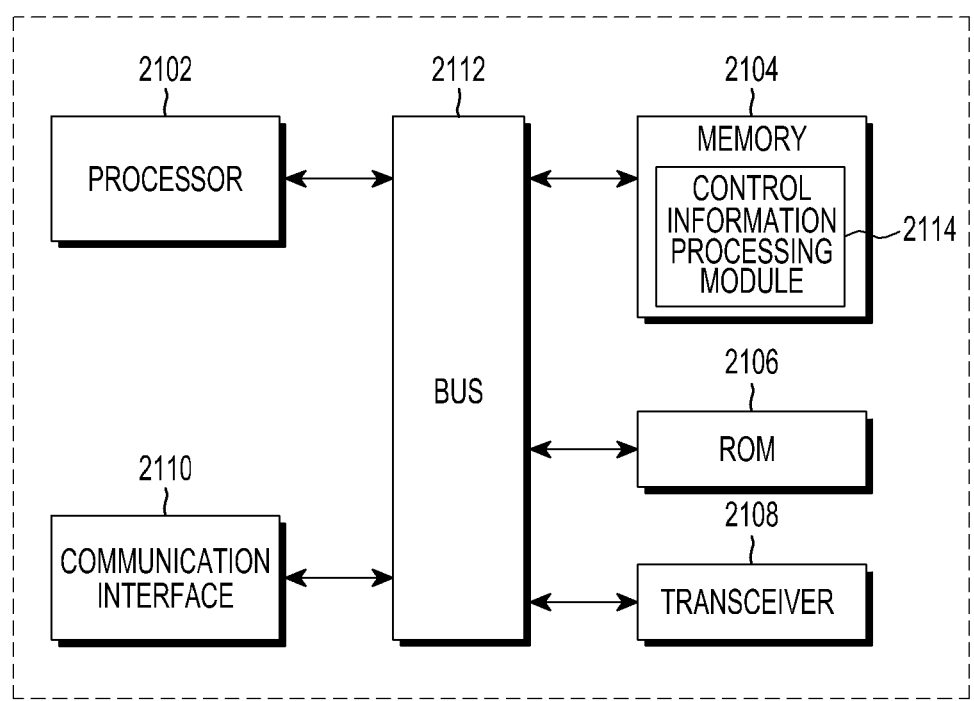
FIG. 21 illustrates a block diagram of a mobile station, such as those shown in FIG. 1, according to an embodiment of the present disclosure.

FIG. 21 illustrates a block diagram of a mobile station according to an embodiment of the present disclosure, such as those shown in FIG. 1, according to an embodiment of the present disclosure.

Referring to FIG. 21, the mobile station 104 includes a processor 2102, memory 2104, a Read Only Memory (ROM) 2106, a transceiver 2108, a communication interface 2110, and a bus 2112.

The processor 2102, as used herein, denotes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 2102 may also include embedded controllers, such as generic or programmable logic devices or arrays, application specific integrated circuits, single-chip computers, smart cards, and the like.

The memory 2104 may be a volatile memory or a non-volatile memory. The memory 2104 may include a control information processing module 2114 for monitoring a communication link for receiving resource allocation control information, decoding the resource allocation control information, and receiving data packet from the BSs 102A-C based on the decoded resource allocation control information, according to the various embodiments illustrated in FIGS. 1 to 20. A variety of computer-readable storage media may be stored in and accessed from the memory elements. Memory elements may include any suitable memory device(s) for storing data and machine-readable instructions such as read only memory, random access memory, erasable programmable read only memory, electrically erasable programmable read only memory, hard drive, removable media drive for handling memory cards, Memory Sticks™, and the like.

Various embodiments of the present disclosure may be implemented in conjunction with modules including functions, procedures, data structures, and application programs, for performing tasks, defining abstract data types, or low-level hardware contexts. The control information processing module 2114 may be stored in the form of machine-readable instructions on any of the above-mentioned storage media and is executable by the processor 2102. For example, a computer program may include the machine-readable instructions capable of monitoring a communication link for receiving resource allocation control information, decoding the resource allocation control information, and receiving data packet from the BSs 102A-C based on the decoded resource allocation control information, according to the teachings and herein described embodiments of the present subject matter. The computer program may be included on a non-transitory computer-readable storage medium and loaded from the storage medium onto a hard drive in the non-volatile memory.

The transceiver 2108 is configured for transmitting and receiving data packets to/from the BSs 102A-C according to the decoded resource allocation control information. The components such as the ROM 2106, the communication interface 2110, and the bus 2112 are well known to the person skilled in the art and hence the explanation thereof is omitted.

Figure 22:
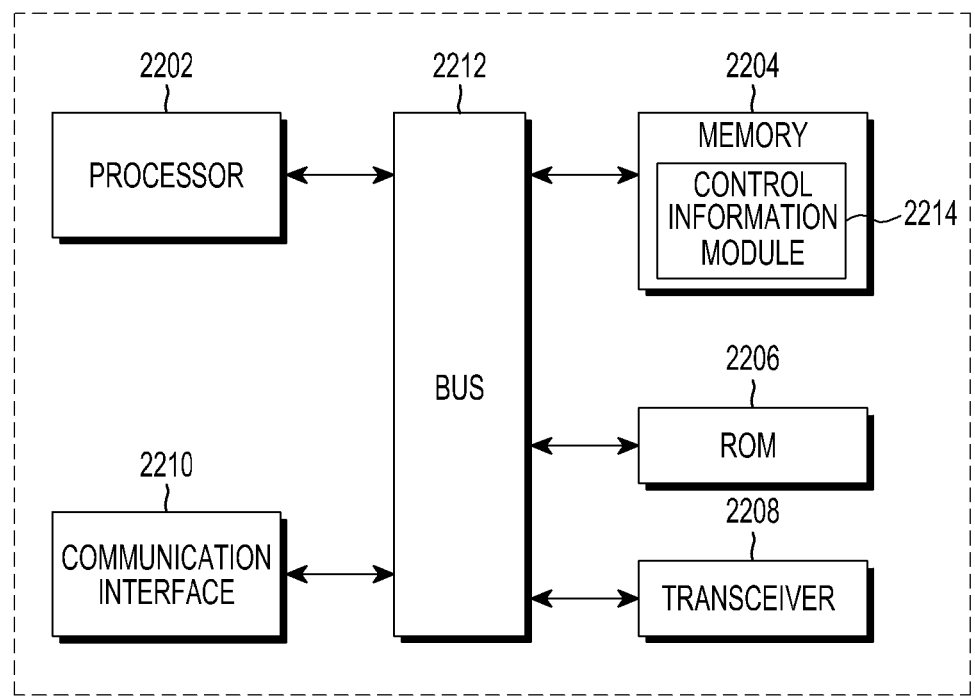
FIG. 22 illustrates a block diagram of a BS, such as those shown in FIG. 1, according to an embodiment of the present disclosure.

FIG. 22 illustrates a block diagram of a BS, such as those shown in FIG. 1, according to an embodiment of the present disclosure.

Referring to FIG. 22, the BS 102 includes a processor 2202, a memory 2204, a ROM 2206, a transceiver 2208, a communication interface 2210, and a bus 2212.

The processor 2202, as used herein, denotes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 2202 may also include embedded controllers, such as generic or programmable logic devices or arrays, application specific integrated circuits, single-chip computers, smart cards, and the like.

The memory 2204 may be a volatile memory or a non-volatile memory. The memory 2204 may include a control information module 2214 for allocating cumulative resources of the BSs 102A-C available for use on respective communication links to the mobile station 104 during every scheduling interval, transmitting resource allocation control information on the allocated cumulative resources to the mobile station 104, and transmitting data packets using respective resources in the allocated cumulative resources during the scheduling interval, according to the various embodiments illustrated in FIGS. 1 to 20. A variety of computer-readable storage media may be stored in and accessed from the memory elements. Memory elements may include any suitable memory device(s) for storing data and machine-readable instructions such as read only memory, random access memory, erasable programmable read only memory, electrically erasable programmable read only memory, hard drive, removable media drive for handling memory cards, Memory Sticks™, and the like.

Various embodiments of the present disclosure may be implemented in conjunction with modules including functions, procedures, data structures, and application programs, for performing tasks, defining abstract data types, or low-level hardware contexts. The control information module 2214 may be stored in the form of machine-readable instructions on any of the above-mentioned storage media and is executable by the processor 2202. For example, a computer program may include the machine-readable instructions capable of allocating cumulative resources of the BSs 102A-C available for use on respective communication links to the mobile station 104 during every scheduling interval, transmitting resource allocation control information on the allocated cumulative resources to the mobile station 104, and transmitting data packets using respective resources in the allocated cumulative resources during the scheduling interval, according to the teachings and herein described various embodiments of the present subject matter. The computer program may be included on a non-transitory computer-readable storage medium and loaded from the storage medium to a hard drive in the non-volatile memory.

The transceiver 2208 is configured for transmitting resource allocation control information on the allocated cumulative resources to the mobile station 104 and transmitting/receiving data packets to/from the mobile station 104 using respective resources in the allocated cumulative resources during the scheduling interval. The components such as the ROM 2206, the communication interface 2210, and the bus 2212 are well known to the person skilled in the art and hence the explanation thereof is omitted.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting control information by a first base station in a communication system, the method comprising:
   determining a plurality of base stations to serve a mobile station with the first base station during a scheduling interval;
   determining a communicating resource to be allocated to the mobile station for the scheduling interval based on resource information received from each of the plurality of base stations;
   selecting, from the plurality of base stations, at least one second base station to transmit, to the mobile station, control information including information on the communicating resource;
   transmitting, to the at least one second base station, the information on the communicating resource and information indicating that the at least one second base station is selected as a base station for transmitting the control information to the mobile station; and
   transmitting, to the mobile station, information about the at least one second base station selected for transmission of the control information.

2. The method of claim 1, further comprising:
   performing a communication with the mobile station using the communicating resource together with the at least one second base station.

3. The method of claim 1, wherein the at least one second base station is selected based on communication link measurements between the mobile station and the plurality of base stations.

4. The method of claim 1, further comprising:
   if two or more base stations are selected as base stations for transmitting the control information:
      determining at least one of an order, a timing, a range, or a validity period required to transmit the control information of each of the two or more base stations, and
      transmitting information about at least one of the order, the timing, the range, or the validity period to the mobile station and the two or more base stations,
   wherein the range indicates a scheduling interval to which the order and the timing are applied, and the validity period indicates a repetition interval of the range in which the order and the timing are valid.

5. The method of claim 1, further comprising:
   identifying that a communication link between the mobile station and the first base station is down;
   receiving a notification indicating that a third base station transmits the control information to the mobile station, wherein the third base station is selected from among the at least one second base station by the mobile station; and
   transmitting, to the third base station, the information on the communicating resource.

6. A method for receiving control information by a mobile station in a communication system, the method comprising:
   receiving, from a first base station, information about at least one second base station;
   receiving, from the at least one second base station, control information including information on a communicating resource determined by the first base station;
   identifying the communicating resource to be allocated to the mobile station for a scheduling interval based on the control information; and
   communicating with the first base station and at least one second base station using the communicating resource during the scheduling interval,
   wherein the communicating resource is determined based on resource information transmitted from each of the at least one second base station to the first base station, and the at least one second base station is selected from a plurality of base stations determined to serve the mobile station with the first base station during the scheduling interval.

7. The method of claim 6, wherein the at least one second base station is selected based on communication link measurements between the mobile station and the plurality of base stations.

8. The method of claim 6, further comprising:
   if two or more base stations are selected as base stations for transmitting the control information, receiving, from the first base station, information about at least one of an order, a timing, a range, or a validity period required to transmit the control information of each of the two or more base stations.

9. The method of claim 8, wherein the range indicates a scheduling interval to which the order and the timing are applied, and the validity period indicates a repetition interval of the range in which the order and the timing are valid.

10. The method of claim 6, further comprising:
    if a communication link between the mobile station and the first base station is down, selecting a third base station from among the at least one second base station;
    transmitting, to the selected third base station, information indicating that the third base station is selected as a base station for transmitting the control information; and
    receiving, from the third base station, the control information.

11. A first base station in a communication system, the first base station comprising:
    a transceiver;
    a communication interface; and
    at least one processor configured to:
       determine a plurality of base stations to serve a mobile station with the first base station during a scheduling interval,
       determine a communicating resource to be allocated to the mobile station for the scheduling interval based on resource information received from each of the plurality of base stations,
       select, from the plurality of base stations, at least one second base station to transmit, to the mobile station, control information including information on the communicating resource,
       control the communication interface to transmit, to the at least one second base station, the information on the communicating resource and information indicating that the at least one second base station is selected as a base station for transmitting the control information to the mobile station, and
       control the transceiver to transmit, to the mobile station information about the at least one second base station selected for transmission of the control information.

12. The first base station of claim 11, wherein the at least one processor is further configured to control the transceiver to perform a communication with the mobile station using the communicating resource together with the at least one second base station.

13. The first base station of claim 11, wherein the at least one second base station is selected based on communication link measurements between the mobile station and the plurality of base stations.

14. The first base station of claim 11,
wherein, if two or more second base stations are selected as base stations for transmitting the control information, the at least one processor is further configured to:
determine at least one of an order, a timing, a range, or a validity period required to transmit the control information of each of the two or more base stations, and
control the transceiver to transmit information about at least one of the order, the timing, the range, or the validity period to the mobile station and the two or more base stations, and
wherein the range indicates the scheduling interval to which the order and the timing are applied, and the validity period indicates a repetition interval of the range in which the order and the timing are valid.

15. The first base station of claim 11, wherein the at least one processor is further configured to:
identify that a communication link between the mobile station and the first base station is down,
control the transceiver to receive a notification indicating that a third base station transmits the control information, wherein the third base station is selected from among the at least one second base station by the mobile station, and
control the communication interface to transmit, to the third base station, the information on the communicating resource.

16. A mobile station in a communication system, the mobile station comprising:
a transceiver; and
at least one processor configured to:
control the transceiver to receive, from a first base station, information about at least one second base station,
control the transceiver to receive, from the at least one second base station, control information including information on a communicating resource determined by the first base station,
identify the communicating resource to be allocated to the mobile station for a scheduling interval based on the control information, and
control the transceiver to communicate with the first base station and at least one second base station using the communicating resource during the scheduling interval,
wherein the communicating resource is determined based on resource information transmitted from each of the at least one second base station to the first base station, and the at least one second base station is selected from a plurality of base stations determined to serve the mobile station with the first base station during the scheduling interval.

17. The mobile station of claim 16, wherein the at least one second base station is selected based on communication link measurements between the mobile station and the plurality of base stations.

18. The mobile station of claim 16,
wherein, if two or more second base stations are selected as base stations for transmitting the control information, the at least one processor is further configured to control the transceiver to receive, from the first base station, information about at least one of an order, a timing, a range, or a validity period required to transmit the control information of each of the two or more base stations.

19. The mobile station of claim 18, wherein the range indicates a scheduling interval to which the order and the timing are applied, and the validity period indicates a repetition interval of the range in which the order and the timing are valid.

20. The mobile station of claim 16, wherein if a communication link between the mobile station and the first base station is down, the at least one processor is further configured to:
select a third base station from among the at least one second base station,
control the transceiver to transmit, to the selected third base station, information indicating that the third base station is selected as a base station for transmitting the control information, and
receive, from the third base station, the control information.

* * * * *